US012108373B2

(12) United States Patent
Iwai et al.

(10) Patent No.: US 12,108,373 B2
(45) Date of Patent: *Oct. 1, 2024

(54) INTEGRATED CIRCUIT

(71) Applicant: PANASONIC INTELLECTUAL PROPERTY CORPORATION OF AMERICA, Torrance, CA (US)

(72) Inventors: Takashi Iwai, Ishikawa (JP); Daichi Imamura, Saitama (JP); Tomofumi Takata, Ishikawa (JP); Yoshihiko Ogawa, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/330,118

(22) Filed: Jun. 6, 2023

(65) Prior Publication Data

US 2023/0319797 A1 Oct. 5, 2023

Related U.S. Application Data

(63) Continuation of application No. 17/571,365, filed on Jan. 7, 2022, now Pat. No. 11,711,791, which is a (Continued)

(30) Foreign Application Priority Data

Jun. 18, 2007 (JP) .................................. 2007-160348

(51) Int. Cl.
*H04W 72/0446* (2023.01)
*H04J 13/00* (2011.01)
(Continued)

(52) U.S. Cl.
CPC ..... *H04W 72/0446* (2013.01); *H04J 13/0055* (2013.01); *H04J 13/0062* (2013.01);
(Continued)

(58) Field of Classification Search
CPC .... H04J 13/0055; H04J 13/0062; H04J 13/22; H04W 72/0446; H04W 72/0453; H04W 72/0466
See application file for complete search history.

(56) References Cited

U.S. PATENT DOCUMENTS 6,226,608 B1 5/2001 Fielder et al.
7,979,077 B2 7/2011 Iwai et al.
(Continued)

FOREIGN PATENT DOCUMENTS

JP 2010506443 A 2/2010
JP 2010516076 A 5/2010
(Continued)

OTHER PUBLICATIONS

3GPP TSG RAN WG1 Meeting #47bis, "Sequence Allocation Method for E-UTRA Uplink Reference Signal," Huawei, R1-070367, Jan. 2007, 3 pages.

(Continued)

*Primary Examiner* — Stephen J Clawson
(74) *Attorney, Agent, or Firm* — Seed IP Law Group LLP

(57) ABSTRACT

It is an object to provide a sequence allocating method that, while maintaining the number of Zadoff-Chu sequences to compose a sequence group, is configured to make it possible to reduce correlations between different sequential groups. This method comprises the steps of setting a standard sequence with a standard sequence length and a standard sequence number in a step, setting a threshold value in accordance with an RB number in a step, setting a sequence length corresponding to RB number in a step, judging (Continued)

whether $|r/N-rb/Nb|=Xth(m)$ is satisfied in a step, including a plurality of Zadoff-Chu sequences with a sequence number and a sequence length in a sequence group in a step if the judgment is positive, and allocating the sequence group to the same cell in a step.

14 Claims, 20 Drawing Sheets

Related U.S. Application Data continuation of application No. 16/847,133, filed on Apr. 13, 2020, now Pat. No. 11,259,299, which is a continuation of application No. 16/163,117, filed on Oct. 17, 2018, now Pat. No. 10,660,092, which is a continuation of application No. 14/683,962, filed on Apr. 10, 2015, now Pat. No. 10,154,484, which is a continuation of application No. 13/846,391, filed on Mar. 18, 2013, now Pat. No. 9,031,026, which is a continuation of application No. 13/438,761, filed on Apr. 3, 2012, now Pat. No. 8,423,038, which is a continuation of application No. 13/082,059, filed on Apr. 7, 2011, now Pat. No. 8,175,609, which is a continuation of application No. 12/665,008, filed as application No. PCT/JP2008/001560 on Jun. 17, 2008, now Pat. No. 7,979,077.

(51) Int. Cl.
  *H04J 13/22* (2011.01)
  *H04W 72/044* (2023.01)
  *H04W 72/0453* (2023.01)

(52) U.S. Cl.
  CPC ......... *H04J 13/22* (2013.01); *H04W 72/0453* (2013.01); *H04W 72/0466* (2013.01)

(56) References Cited

U.S. PATENT DOCUMENTS

| | | | |
|---|---|---|---|
| 2007/0297381 | A1 | 12/2007 | Oketani et al. |
| 2008/0072269 | A1 | 3/2008 | Malladi et al. |
| 2008/0168114 | A1 | 7/2008 | Han et al. |
| 2008/0232300 | A1* | 9/2008 | McCoy ............... H04L 25/0204 370/328 |
| 2008/0235314 | A1 | 9/2008 | Lee et al. |
| 2008/0253484 | A1 | 10/2008 | Kakura et al. |
| 2008/0318608 | A1* | 12/2008 | Inoue ...................... H04J 13/18 455/446 |
| 2009/0186625 | A1 | 7/2009 | Qu et al. |
| 2009/0252260 | A1 | 10/2009 | Noh et al. |
| 2009/0303960 | A1 | 12/2009 | Qu et al. |
| 2010/0099423 | A1 | 4/2010 | Ogawa et al. |
| 2010/0195700 | A1 | 8/2010 | Ogawa et al. |
| 2010/0210274 | A1 | 8/2010 | Iwai et al. |

FOREIGN PATENT DOCUMENTS

| | | |
|---|---|---|
| JP | 2010517391 A | 5/2010 |
| JP | 2010518677 A | 5/2010 |
| JP | 2010519867 A | 6/2010 |
| WO | WO 2008044553 A1 | 4/2008 |
| WO | WO 2008155904 A1 | 12/2008 |

OTHER PUBLICATIONS

3GPP TSG RAN WG1 Meeting #48bis, "Binding method for UL RS sequence with different lengths," LG Electronics, R1-071542, Mar. 2007, pp. 1-4.
3GPP TSG RAN WG1 Meeting #49bis, "Sequence Grouping Rule for UL DM RS," Huawei, R1-072893, Jun. 2007, pp. 1-8.
3GPP TSG RAN WG1 Meeting #49bis, "Further consideration on uplink RS hopping and grouping," Panasonic, R1-072804, Jun. 2007, pp. 1-8.
3GPP TSG RAN WG1 Meeting #51 bis, "RS sequence grouping for E-UTRA uplink," Panasonic, R1-080145, Jan. 2008, pp. 1-5.
3GPP TSG RAN WG1 Meeting #51bis, "Interference Mitigation between Sequence-Group," Huawei, R1-080115, Jan. 2008, pp. 1-4.
3GPP TSG RAN WG1 Meeting #51 bis, "Details on Grouping for UL DM RS," LG Electronics, R1-080257, Jan. 2008, pp. 1-6.
3GPP TSG RAN WG1 #48, "Binding Method for UL RS Sequence with Different Lengths," LG Electronics, R1-070911, Feb. 2007, pp. 1-4.
3GPP TSG RAN WG1 #51-bis, "Way Forward on the Sequence Grouping for UL DM RS," Huawei, et al., R1-080576, Jan. 2008, pp. 1-2.
3GPP TSG RAN WG1 Meeting #46bis, "Multiplexing Method for Orthogonal Reference Signals for E-UTRA Uplink," NTT DoCoMo, et al., R1-062726, Oct. 2006, pp. 1-13.
3GPP TSG-RAN WG1 #49, "Details on PSC sequence design," QUALCOMM Europe, R1-072009, May 2007, 8 pages.
B. M. Popovic, "Spreading Sequences for Mutlicarrier CDMA Systems," IEEE Transactions on Communications, vol. 47, No. 6, Jun. 1999, pp. 918-926.
European Search Report, dated Sep. 29, 2014.
English translation of the Search Report which is an annex to Office Action, dated Apr. 4, 2018, issued in corresponding Chinese Patent Application No. 201710144115.1, filed Jun. 17, 2008, 3 pages.
International Search Report, dated Aug. 26, 2008.
Japanese Office Action, dated Jul. 13, 2010.
Japanese Office Action, dated Dec. 21, 2010.
N. Miki, et al., "Structure and Channel Coding Schemes for Layer 1/Layer 2 Control Channel in OFDM Based Evolved UTRA Downlink," IEICE Technical Report, RCS2006-113, Aug. 2006, vol. 106, No. 223, pp. 49-54 and two bibliographic pages.
R1-070152—"Uplink Reference Signal Generation Methods," Motorola, 3GPP RAN WG1 #47bis, Sorrento, Italy, Jan. 15-19, 2007, 1-9 pages.
R1-072550—"Uplink Reference Signal Coordination," LG Electronics, 3GPP TSG RAN WG1 #49, Kobe, Japan, May 7-11, 2007, 7 pages.
Y. Ogawa, et al., "Pilot Signal Generation Scheme using Frequency Dependent Cyclic Shift Sequence For Inter-cell Interference Reduction," IEICE Technical Report, RCS2007-243, Mar. 2008, pp. 341-346.

\* cited by examiner

| RB# | N | r |
|---|---|---|
| 1 | 13 | 1 |
| 2 | 29 | 2 3 |
| 3 | 37 | 2 3 4 |
| 4 | 53 | 3 4 5 6 |
| 5 | 61 | 3 4 5 6 7 |
| 6 | 73 | 3 4 5 6 7 8 |
| 8 | 97 | 4 5 6 7 8 9 10 11 |
| 9 | 109 | 5 6 7 8 9 10 11 12 |
| 10 | 127 | 5 6 7 8 9 10 11 12 13 14 |
| 12 | 149 | 6 7 8 9 10 11 12 13 14 15 16 17 |
| 15 | 181 | 7 8 9 10 11 12 13 14 15 16 17 18 19 20 |
| 16 | 193 | 8 9 10 11 12 13 14 15 16 17 18 19 20 21 22 |
| 18 | 223 | 9 10 11 12 13 14 15 16 17 18 19 20 21 22 23 24 25 |
| 20 | 241 | 10 11 12 13 14 15 16 17 18 19 20 21 22 23 24 25 26 27 |
| 24 | 293 | 12 13 14 15 16 17 18 19 20 21 22 23 24 25 26 27 28 29 30 31 32 33 |

FIG.5A

| RB# | N | r |
|---|---|---|
| 1 | 13 | 2 |
| 2 | 29 | 4 5 |
| 3 | 37 | 5 6 7 |
| 4 | 53 | 7 8 9 10 |
| 5 | 61 | 8 9 10 11 |
| 6 | 73 | 9 10 11 12 13 14 |
| 8 | 97 | 12 13 14 15 16 17 18 |
| 9 | 109 | 13 14 15 16 17 18 19 20 |
| 10 | 127 | 15 16 17 18 19 20 21 22 23 24 |
| 12 | 149 | 18 19 20 21 22 23 24 25 26 27 28 |
| 15 | 181 | 21 22 23 24 25 26 27 28 29 30 31 32 33 34 |
| 16 | 193 | 23 24 25 26 27 28 29 30 31 32 33 34 35 36 37 |
| 18 | 223 | 26 27 28 29 30 31 32 33 34 35 36 37 38 39 40 41 42 |
| 20 | 241 | 28 29 30 31 32 33 34 35 36 37 38 39 40 41 42 43 44 45 46 |
| 24 | 293 | 34 35 36 37 38 39 40 41 42 43 44 45 46 47 48 49 50 51 52 53 54 55 56 |

FIG.5B

| RB# | N | r |
|---|---|---|
| 1 | 13 | 1 |
| 2 | 29 | 2 3 |
| 3 | 37 | 2 3 4 |
| 4 | 53 | 3 4 5 6 |
| 5 | 61 | 3 4 5 6 7 |
| 6 | 73 | 3 4 5 6 7 8 |
| 8 | 97 | 4 5 6 7 8 9 10 11 |
| 9 | 109 | 5 6 7 8 9 10 11 12 |
| 10 | 127 | 5 6 7 8 9 10 11 12 13 14 |
| 12 | 149 | 6 7 8 9 10 11 12 13 14 15 16 17 |
| 15 | 181 | 7 8 9 10 11 12 13 14 15 16 17 18 19 20 |
| 16 | 193 | 8 9 10 11 12 13 14 15 16 17 18 19 20 21 22 |
| 18 | 223 | 10 11 12 13 14 15 16 17 18 19 20 21 22 23 24 25 |
| 20 | 241 | 11 12 13 14 15 16 17 18 19 20 21 22 23 24 25 26 27 |
| 24 | 293 | 15 16 17 18 19 20 21 22 23 24 25 26 27 28 29 30 31 32 33 |

FIG.7A

| RB# | N | r |
|---|---|---|
| 1 | 13 | 2 |
| 2 | 29 | 4 5 |
| 3 | 37 | 5 6 7 |
| 4 | 53 | 7 8 9 10 |
| 5 | 61 | 8 9 10 11 |
| 6 | 73 | 9 10 11 12 13 14 |
| 8 | 97 | 12 13 14 15 16 17 18 |
| 9 | 109 | 13 14 15 16 17 18 19 20 |
| 10 | 127 | 15 16 17 18 19 20 21 22 23 24 |
| 12 | 149 | 18 19 20 21 22 23 24 25 26 |
| 15 | 181 | 21 22 23 24 25 26 27 28 29 30 31 |
| 16 | 193 | 23 24 25 26 27 28 29 30 31 32 33 |
| 18 | 223 | 26 27 28 29 30 31 32 33 34 35 36 37 |
| 20 | 241 | 29 30 31 32 33 34 35 36 37 38 39 40 |
| 24 | 293 | 37 38 39 40 41 42 43 44 45 46 47 48 |

FIG.7B

| RB# | N | r |
|---|---|---|
| 1 | 13 | 1 |
| 2 | 29 | 2 3 |
| 3 | 37 | 2 3 4 |
| 4 | 53 | 3 4 5 |
| 5 | 61 | 3 4 5 6 |
| 6 | 73 | 3 4 5 6 7 |
| 8 | 97 | 5 6 7 8 9 10 |
| 9 | 109 | 6 7 8 9 10 11 |
| 10 | 127 | 7 8 9 10 11 12 13 |
| 12 | 149 | 8 9 10 11 12 13 14 15 |
| 15 | 181 | 11 12 13 14 15 16 17 |
| 16 | 193 | 11 12 13 14 15 16 17 18 |
| 18 | 223 | 14 15 16 17 18 19 20 21 |
| 20 | 241 | 15 16 17 18 19 20 21 22 |
| 24 | 293 | 20 21 22 23 24 25 |

FIG.10A

| RB# | N | r |
|---|---|---|
| 1 | 13 | 2 |
| 2 | 29 | 4 5 |
| 3 | 37 | 5 6 7 |
| 4 | 53 | 7 8 9 10 |
| 5 | 61 | 8 9 10 11 |
| 6 | 73 | 9 10 11 12 13 |
| 8 | 97 | 13 14 15 16 17 |
| 9 | 109 | 14 15 16 17 18 19 |
| 10 | 127 | 17 18 19 20 21 22 23 |
| 12 | 149 | 20 21 22 23 24 25 26 |
| 15 | 181 | 24 25 26 27 28 29 30 31 |
| 16 | 193 | 26 27 28 29 30 31 32 33 |
| 18 | 223 | 31 32 33 34 35 36 37 38 |
| 20 | 241 | 34 35 36 37 38 39 40 |
| 24 | 293 | 42 43 44 45 46 47 48 |

FIG.10B

| RB# | N | r |
|---|---|---|
| 1 | 13 | 1 |
| 2 | 29 | 2 3 |
| 3 | 37 | 2 3 4 |
| 4 | 53 | 3 4 5 6 |
| 5 | 61 | 3 4 5 6 7 |
| 6 | 73 | 3 4 5 6 7 8 |
| 8 | 97 | 4 5 6 7 8 9 10 11 |
| 9 | 109 | THRESHOLD FOR NUMBER OF RB'S    5 6 7 8 9 10 11 12 |
| 10 | 127 | 5 6 7 8 9 10 11 12 13 14 |
| 12 | 149 | 9 10 11 12 13 14 |
| 15 | 181 | 11 12 13 14 15 16 17 |
| 16 | 193 | 12 13 14 15 16 17 18 |
| 18 | 223 | 13 14 15 16 17 18 19 20 21 |
| 20 | 241 | 14 15 16 17 18 19 20 21 22 23 |
| 24 | 293 | 17 18 19 20 21 22 23 24 25 26 27 28 |

FIG.12A

| RB# | N | r |
|---|---|---|
| 1 | 13 | 2 |
| 2 | 29 | 4 5 |
| 3 | 37 | 5 6 7 |
| 4 | 53 | 7 8 9 10 |
| 5 | 61 | 8 9 10 11 |
| 6 | 73 | 9 10 11 12 13 14 |
| 8 | 97 | 12 13 14 15 16 17 18 |
| 9 | 109 | THRESHOLD FOR NUMBER OF RB'S    13 14 15 16 17 18 19 20 |
| 10 | 127 | 15 16 17 18 19 20 21 22 23 24 |
| 12 | 149 | 21 22 23 24 25 |
| 15 | 181 | 25 26 27 28 29 30 31 |
| 16 | 193 | 26 27 28 29 30 31 32 33 |
| 18 | 223 | 31 32 33 34 35 36 37 38 |
| 20 | 241 | 33 34 35 36 37 38 39 40 41 |
| 24 | 293 | 40 41 42 43 44 45 46 47 48 49 50 |

FIG.12B

| RB# | N | r |
|---|---|---|
| 1 | 13 | 1 |
| 2 | 29 | 2 3 |
| 3 | 37 | 2 3 4 |
| 4 | 53 | 3 4 5 |
| 5 | 61 | 3 4 5 6 |
| 6 | 73 | 3 4 5 6 7 |
| 8 | 97 | 5 6 7 8 9 10 |
| 9 | 109 | 6 7 8 9 10 11 |
| 10 | 127 | 7 8 9 10 11 12 13 |
| 12 | 149 | 8 9 10 11 12 13 14 15 |
| 15 | 181 | 11 12 13 14 15 16 17 |
| 16 | 193 | 11 12 13 14 15 16 17 18 |
| 18 | 223 | 14 15 16 17 18 19 20 21 |
| 20 | 241 | 15 16 17 18 19 20 21 22 |
| 24 | 293 | 20 21 22 23 24 25 |

FIG.19A

| RB# | N | r |
|---|---|---|
| 1 | 13 | 8 |
| 2 | 29 | 17 18 |
| 3 | 37 | 22 23 24 |
| 4 | 53 | 31 32 33 34 |
| 5 | 61 | 36 37 38 39 |
| 6 | 73 | 43 44 45 46 47 |
| 8 | 97 | 57 58 59 60 61 62 |
| 9 | 109 | 64 65 66 67 68 69 70 |
| 10 | 127 | 75 76 77 78 79 80 81 |
| 12 | 149 | 88 89 90 91 92 93 94 95 |
| 15 | 181 | 108 109 110 111 112 113 114 115 |
| 16 | 193 | 115 116 117 118 119 120 121 122 |
| 18 | 223 | 134 135 136 137 138 139 140 141 |
| 20 | 241 | 145 146 147 148 149 150 151 152 |
| 24 | 293 | 178 179 180 181 182 183 |

FIG.19B

| RB# | N | r |
|---|---|---|
| 1 | 13 | 1 |
| 2 | 29 | 2 3 |
| 3 | 37 | 2 3 4 |
| 4 | 53 | 3 4 5 6 |
| 5 | 61 | 3 4 5 6 7 |
| 6 | 73 | 3 4 5 6 7 8 |
| 8 | 97 | 4 5 6 7 8 9 10 11 |
| 9 | 109 | 5 6 7 8 9 10 11 12 |
| 10 | 127 | THRESHOLD  5 6 7 8 9 10 11 12 13 14 |
| 12 | 149 | 8 9 10 11 12 13 14 15 |
| 15 | 181 | 11 12 13 14 15 16 17 |
| 16 | 193 | 11 12 13 14 15 16 17 18 |
| 18 | 223 | 14 15 16 17 18 19 20 21 |
| 20 | 241 | 15 16 17 18 19 20 21 22 |
| 24 | 293 | 20 21 22 23 24 25 |

FIG.20A

| RB# | N | r |
|---|---|---|
| 1 | 13 | 8 |
| 2 | 29 | 17 18 |
| 3 | 37 | 22 23 24 |
| 4 | 53 | 31 32 33 34 |
| 5 | 61 | 36 37 38 39 |
| 6 | 73 | 43 44 45 46 47 |
| 8 | 97 | 56 57 58 59 60 61 62 63 |
| 9 | 109 | 63 64 65 66 67 68 69 70 71 |
| 10 | 127 | THRESHOLD  74 75 76 77 78 79 80 81 82 83 |
| 12 | 149 | 88 89 90 91 92 93 94 95 |
| 15 | 181 | 108 109 110 111 112 113 114 115 |
| 16 | 193 | 115 116 117 118 119 120 121 122 |
| 18 | 223 | 134 135 136 137 138 139 140 141 |
| 20 | 241 | 145 146 147 148 149 150 151 152 |
| 24 | 293 | 178 179 180 181 182 183 |

FIG.20B

INTEGRATED CIRCUIT

BACKGROUND

Technical Field

The present disclosure relates to a sequence allocating method, transmitting method and radio mobile station apparatus that are used in a cellular radio communication system.

Description of the Related Art

In 3GPP LTE (3rd Generation Partnership Project Long Term Evolution), a Zadoff-Chu sequence ("ZC sequence") is adopted as a reference signal ("RS") that is used in uplink. The reason for adopting a ZC sequence as an RS is that a ZC sequence has a uniform frequency characteristic and has good auto-correlation and cross-correlation characteristics. A ZC sequence is a kind of CAZAC (Constant Amplitude and Zero Auto-correlation Code) sequence and represented by following equation 1 or equation 2.

$$a_r(k) = \begin{cases} e^{-j\frac{2\pi r}{N}(k^2/2+qk)} & , N\text{:even} \\ e^{-j\frac{2\pi r}{N}(k(k+1)/2+qk)} & , N\text{:odd} \end{cases} \quad \text{(Equation 1)}$$

$$a_r(k) = \begin{cases} e^{j\frac{2\pi r}{N}(k^2/2+qk)} & , N\text{:even} \\ e^{j\frac{2\pi r}{N}(k(k+1)/2+qk)} & , N\text{:odd} \end{cases} \quad \text{(Equation 2)}$$

In equation 1 and equation 2, "N" is the sequence length, "r" is the ZC sequence number, and "N" and "r" are coprime. Also, "q" is an arbitrary integer. It is possible to generate N−1 quasi-orthogonal sequences of good cross-correlation characteristics from a ZC sequence having the sequence length N of a prime number. In this case, the cross-correlation is constant at IN between the N−1 quasi-orthogonal sequences generated.

Here, in the RS's that are used in uplink, the reference signal for channel estimation used to demodulate data (i.e., DM-RS (Demodulation Reference Signal)) is transmitted in the same band as the data transmission bandwidth. That is, when the data transmission bandwidth is narrow, a DM-RS is also transmitted in a narrow band. For example, if the data transmission bandwidth is one RB (Resource Block), the DM-RS transmission bandwidth is also one RB. Likewise, if the data transmission bandwidth is two RB's, the DM-RS transmission bandwidth is also two RB's. Also, in 3GPP LTE, one RB is comprised of twelve subcarriers. Consequently, a ZC sequence having a sequence length N of 11 or 13 is used as a DM-RS that is transmitted in one RB, and a ZC sequence having a sequence length N of 23 or 29 is used as a DM-RS that is transmitted in two RB's. Here, when a ZC sequence having a sequence length N of 11 or 23 is used, a DM-RS of 12 subcarriers or 24 subcarriers is generated by cyclically expanding the sequence, that is, by copying the head data of the sequence to the tail end of the sequence. On the other hand, when a ZC sequence having a sequence length N of 13 or 29 is used, a DM-RS of 12 subcarriers or 24 subcarriers is generated by performing truncation, that is, by deleting part of the sequence.

As a method of allocating ZC sequences, to reduce the interference between DM-RS's that are used between different cells, that is, to reduce the inter-cell interference of DM-RS, in each RB, ZC sequences of different sequence numbers are allocated to adjacent cells as DM-RS's. The data transmission bandwidth is determined by the scheduling in each cell, and therefore DM-RS's of different transmission bandwidths are multiplexed between cells. However, if ZC sequences of different transmission bandwidths, that is, ZC sequences of different sequence lengths, are multiplexed, a specific combination of ZC sequence numbers has a high cross-correlation.

FIG. 1 is a diagram illustrating cross-correlation characteristics between ZC sequences in combinations of different sequence numbers, which are acquired by computer simulation. To be more specific, FIG. 1 illustrates the cross-correlation characteristics between a ZC sequence of a sequence length N=11 and sequence number r=3, and ZC sequences of a sequence length N=23 and sequence numbers r=1 to 6. In FIG. 1, the horizontal axis represents the delay time using the number of symbols, and the vertical axis represents the normalized cross-correlation values, that is, the values dividing the cross-correlation values by N. As shown in FIG. 1, the maximum cross-correlation value is very high with the combination of a ZC sequence of r=3 and N=11 and a ZC sequence of r=6 and N=23, and is about three times higher than the cross-correlation value in the single transmission bandwidth, $1/\sqrt{N}$, that is, $1/\sqrt{11}$.

FIG. 2 is a diagram illustrating the inter-cell interference of DM-RS in a case where specific combinations of ZC sequences that increase cross-correlation are allocated to adjacent cells. To be more specific, a ZC sequence of r=a and N=11 and a ZC sequence of r=b and N=23 are allocated to cell #A, and a ZC sequence of r=c and N=23 and a ZC sequence of r=d and N=11 are allocated to cell #B. In this case, the combination of the ZC sequence of r=a and N=11 allocated to cell #A and the ZC sequence of r=c and N=23 allocated to cell #B, or the combination of the ZC sequence of r=b and N=23 allocated to cell #A and the ZC sequence of r=d and N=11 allocated to cell #B, increases the inter-cell interference of DM-RS, and, consequently, degrades the accuracy of channel estimation and degrades the data demodulation performance degrades significantly.

To avoid such problems, the ZC sequence allocating method disclosed in Non-Patent Document 1 is used in a cellular radio communication system. To reduce inter-cell interference, Non-Patent Document 1 suggests allocating a combination of ZC sequences of high cross-correlation and different sequence lengths, to a single cell.

FIG. 3 is a diagram illustrating the ZC sequence allocating methods disclosed in Non-Patent Document 1 and Non-Patent Document 2. In FIG. 3, the example shown in FIG. 2 is used. As shown in FIG. 3, a combination of ZC sequences of high cross-correlation, that is, a combination of a ZC sequence of r=a and N=11 and a ZC sequence of r=c and N=23, is allocated to a single cell (cell #A in this case). Also, another combination of ZC sequences of high cross-correlation, that is, a combination of a ZC sequence of r=d and N=11 and a ZC sequence of r=b and N=23, is allocated to a single cell (cell #B in this case). In the single cell, transmission bands are scheduled by one radio base station apparatus, and, consequently, ZC sequences of high correlation allocated to the same cell, are not multiplexed. Therefore, inter-cell interference is reduced.

Also, Non-Patent Document 2 proposes a method of finding a combination of ZC sequence numbers, which are used in RB's (hereinafter referred to as a "sequence group"). ZC sequences have a feature of having higher cross-correlation when the difference of r/N, that is, the difference of sequence number/sequence length is smaller. Therefore, based on a sequence of an arbitrary RB (e.g., one RB), ZC sequences that make the difference of r/N equal to or less than a predetermined threshold, are found from the ZC sequences of each RB, and the multiple ZC sequences found are allocated to a cell as one sequence group.

FIG. 4 is a diagram illustrating a sequence group generation method disclosed in Non-Patent Document 2. In FIG. 4, the horizontal axis represents r/N, and the vertical axis represents the ZC sequence of each RB. First, the reference sequence length Nb and reference sequence number rb are set. Hereinafter, a ZC sequence having the reference sequence length Nb and reference sequence number rb is referred to as a "reference sequence." For example, if Nb is 13 (which is the sequence length associated with one RB) and rb is 1 (which is selected between 1 and Nb−1), rb/Nb is 1/13. Next, ZC sequences that make the difference of r/N from the reference rb/Nb equal to or less than a predetermined threshold, are found from the ZC sequences of each RB to generate a sequence group. Also, the reference sequence number is changed, and, in the same process as above, other sequence groups are generated. Thus, it is possible to generate different sequence groups for the number of reference sequence numbers, that is, it is possible to generate Nb−1 different sequence groups. Here, if ranges for selecting ZC sequences, in which a difference from rb/Nb is equal to or less than a predetermined threshold, overlap between adjacent sequence groups, the same ZC sequences are included in the plurality of sequence groups, and therefore the sequence numbers overlap between cells. Therefore, to prevent ranges for selecting ZC sequences in adjacent sequence groups from overlapping, the above predetermined threshold is set to, for example, a value less than 1/(2Nb).

FIG. 5A and FIG. 5B illustrate examples of sequence groups generated by the sequence group generation method disclosed in Non-Patent Document 2. Here, the sequence length N is set to the prime number that is larger than the maximum possible size of transmission in the transmission bandwidth and that is the closest to this size, and, furthermore, the sequence length N is uniquely determined from the number of RB's. FIG. 5A and FIG. 5B illustrate sequence groups (ZC sequence group 1 and ZC sequence group 2) comprised of ZC sequences that satisfy following equation 3 in a case where the reference sequence length Nb is 13 and the reference sequence number rb is 1 or 2. In equation 3, the threshold Xth is, for example, 1/(2Nb), (i.e., 1/26) to prevent the same sequence from being included in a plurality of sequence groups.

$$|rb/Nb - r/N| \leq X\text{th} \quad (3)$$

Thus, according to the sequence allocating methods disclosed in Non-Patent Document 1 and Non-Patent Document 2, a sequence group comprised of ZC sequences that make a difference of r/N equal to or less than a predetermined threshold, that is, a sequence group comprised of ZC sequences having greater cross-correlation than a predetermined threshold, is generated, and the generated sequence group is allocated to the single cell. By this means, it is possible to allocate a combination of ZC sequences of large cross-correlation and different sequence lengths to the single cell, and reduce inter-cell interference.

Non-Patent Document 1: Huawei, R1-070367, "Sequence Allocating method for E-UTRA Uplink Reference Signal", 3GPP TSG RAN WG1Meeting #47bis, Sorrento, Italy 15-19 Jan. 2007

Non-Patent Document 2: LG Electronics, R1-071542, "Binding method for UL RS sequence with different lengths", 3GPP TSG RAN WG1Meeting #48bis, St. Julians, Malta, Mar. 26-30, 2007

BRIEF SUMMARY

Problems to be Solved by the Invention

However, with the sequence allocating method disclosed in Non-Patent Document 2, the threshold Xth related to a difference of r/N is a fixed value regardless of the number of RB's, and, consequently, the following problem arises.

FIG. 6 is a diagram illustrating a problem that arises when the threshold Xth is set higher. As shown in FIG. 6, if the threshold Xth is set higher, ZC sequences located near the boundary of adjacent sequence groups have a smaller difference of r/N, and therefore cross-correlation increases. That is, the cross-correlation between sequence groups increases.

FIG. 7A and FIG. 7B illustrate problems that arise when the threshold Xth is set higher, using specific examples of sequence groups. In FIG. 7A and FIG. 7B, the sequence group examples shown in FIG. 5A and FIG. 5B are used. In the ZC sequences included in the two sequence groups (i.e., ZC sequence group 1 and ZC sequence group 2) shown in FIG. 7A and FIG. 7B, the hatched ZC sequences have a smaller difference of r/N from and larger cross-correlation with ZC sequences of other sequence groups. Here, as shown in FIG. 4, the number of ZC sequences in each RB is N−1 at 1/N intervals in the range of r/N=0 to 1. Therefore, as shown in FIG. 7A and FIG. 7B, when the number of RB's is larger, the number of ZC sequences increases that make a difference of r/N from a reference ZC sequence smaller than a threshold. Also, when the number of RB's is larger, that is, when the sequence length N is longer, the number of hatched ZC sequences increases.

By contrast, when the threshold Xth is set smaller, the number of ZC sequences forming a sequence group decreases. Especially, when the number of RB's is smaller, that is, when the sequence length N is shorter, the number of sequences that are present in the range of r/N=0 to 1 at 1/N intervals, N−1, decreases, and, consequently, when the threshold is further smaller, the number of ZC sequences forming a sequence group further decreases. Also, to randomize the influence of interference, if sequence hopping to switch sequence numbers at predetermined time intervals is adapted and there are few candidates of sequence numbers to be switched, the randomization of interference provides no effect.

It is therefore an object of the present disclosure to provide a sequence allocating method that can reduce cross-correlation between different sequence groups while maintaining the number of ZC sequences forming a sequence group that are allocated, in a cellular radio communication system.

Means for Solving the Problem

The sequence allocating method of the present disclosure for Zadoff-Chu sequences represented by equation 1 in a cellular radio communication system, includes: a reference setting step of setting a reference sequence length Nb and a reference sequence number rb; a first threshold setting step of setting a first threshold based on the sequence length N; a selecting step of selecting a plurality of Zadoff-Chu sequences, in which a first difference representing a difference between rb/Nb and r/N is equal to or less than the first threshold, from the Zadoff-Chu sequences generated according to the equation 1; and an allocating step of allocating the plurality of Zadoff-Chu sequences selected, to a same cell.

The radio mobile station of the present disclosure that transmits Zadoff-Chu sequences represented by equation 1 as a reference signal, employs a configuration having: a setting section that sets a threshold based on a sequence length N signaled from a radio base station apparatus; a selecting section that selects a Zadoff-Chu sequence, in which a difference between rb/Nb and r/N is equal to or less than the threshold, from the Zadoff-Chu sequences generated according to equation 1, using a reference sequence number rb and a reference sequence length Nb signaled from the radio base station apparatus; and a transmitting section that transmits the selected Zadoff-Chu sequence as the reference signal.

The transmitting method of the present disclosure whereby a radio mobile station apparatus transmits Zadoff-Chu sequences represented by equation 1 as a reference signal, in which the radio mobile station apparatus receives a sequence length N and a reference sequence number rb signaled from the radio base station apparatus; selects a Zadoff-Chu sequence, which satisfies a condition that a difference between rb/Nb (where Nb is a reference sequence length) and r/N is equal to or less than a threshold associated with the sequence length N, using the received sequence length N and the received reference sequence number rb; and transmits the selected Zadoff-Chu sequence as the reference signal.

Advantageous Effect of Invention

According to the present disclosure, it is possible to reduce cross-correlation between different groups while maintaining the number of ZC sequences forming sequence groups.

BRIEF DESCRIPTION OF THE SEVERAL VIEWS OF THE DRAWINGS

FIG. 5A is a diagram illustrating an example of a sequence group generated by a sequence group generation method according to the prior art (ZC sequence group 1);

FIG. 5B is a diagram illustrating an example of a sequence group generated by a sequence group generation method according to the prior art (ZC sequence group 2);

FIG. 7A is a diagram illustrating a problem with the prior art that arises when the threshold Xth is set higher, using a detailed example of a sequence group (ZC sequence group 1);

FIG. 7B is a diagram illustrating a problem with the prior art that arises when the threshold Xth is set higher, using a detailed example of a sequence group (ZC sequence group 2);

FIG. 1 A is a diagram illustrating an example of a sequence group acquired by a sequence allocating method according to Embodiment 1 of the present disclosure (ZC sequence group 1);

FIG. 10B is a diagram illustrating an example of a sequence group acquired by a sequence allocating method according to Embodiment 1 of the present disclosure (ZC sequence group 2);

FIG. 12A is a diagram illustrating an example of a sequence group acquired by a sequence allocating method according to Embodiment 1 of the present disclosure (ZC sequence group 1);

FIG. 12B is a diagram illustrating an example of a sequence group acquired by a sequence allocating method according to Embodiment 1 of the present disclosure (ZC sequence group 2);

FIG. 19A is a diagram illustrating an example of a sequence group acquired by a sequence allocating method according to Embodiment 2 of the present disclosure (ZC sequence group 1);

FIG. 19B is a diagram illustrating an example of a sequence group acquired by a sequence allocating method according to Embodiment 2 of the present disclosure (ZC sequence group 8);

FIG. 20A is a diagram illustrating an example of a sequence group acquired when the number of RB's allowing sequences to be deleted, is set 10 or greater (ZC sequence group 1); and FIG. 20B is a diagram illustrating an example of a sequence group acquired when the number of RB's allowing sequences to be deleted, is set 10 or greater (ZC sequence group 8).

DETAILED DESCRIPTION

Figure 1:
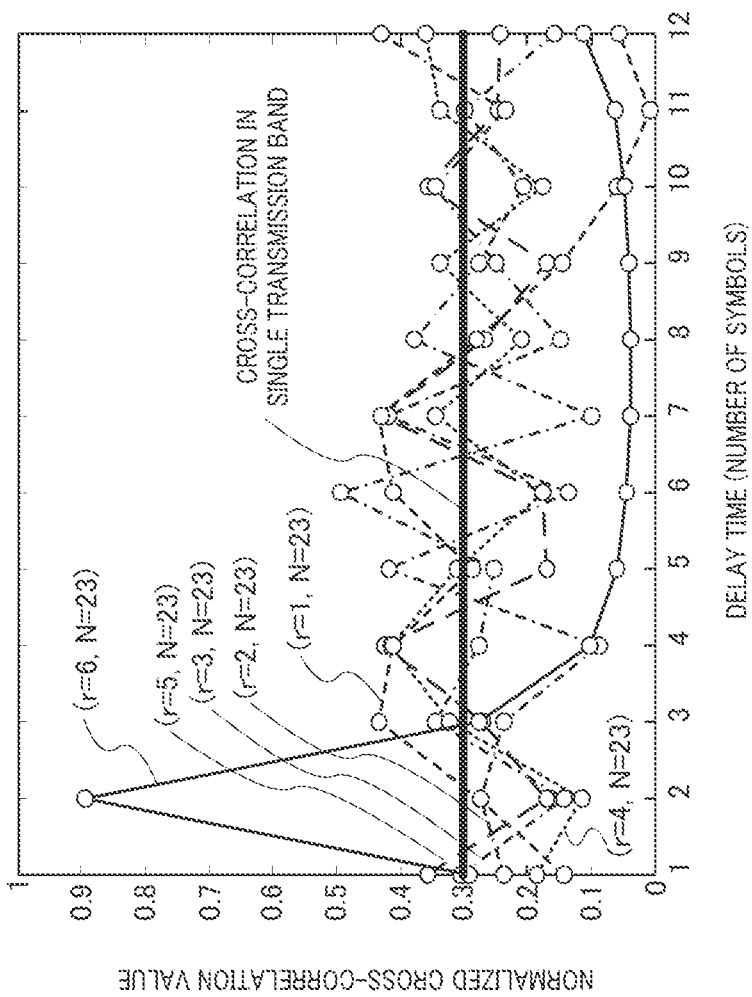
FIG. 1 is a diagram illustrating cross-correlation characteristics between ZC sequences in combinations of different sequence numbers, which are acquired by computer simulation, according to the prior art.
Figure 2:
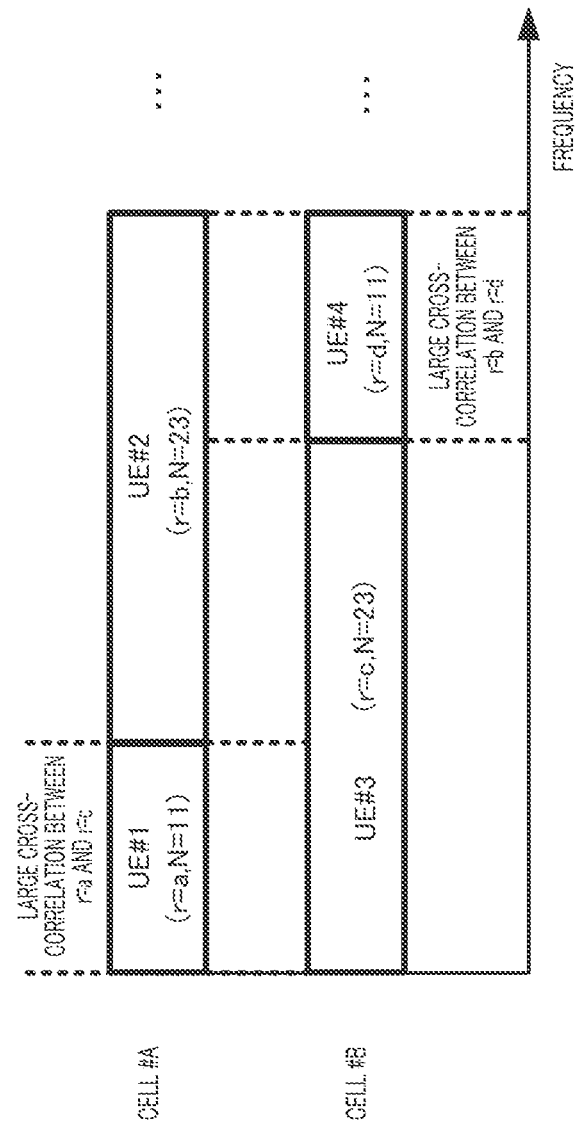
FIG. 2 is a diagram illustrating inter-cell interference between DM-RS's in a case where specific combinations of ZC sequences that increase cross-correlation are allocated to adjacent cells, according to the prior art.
Figure 3:
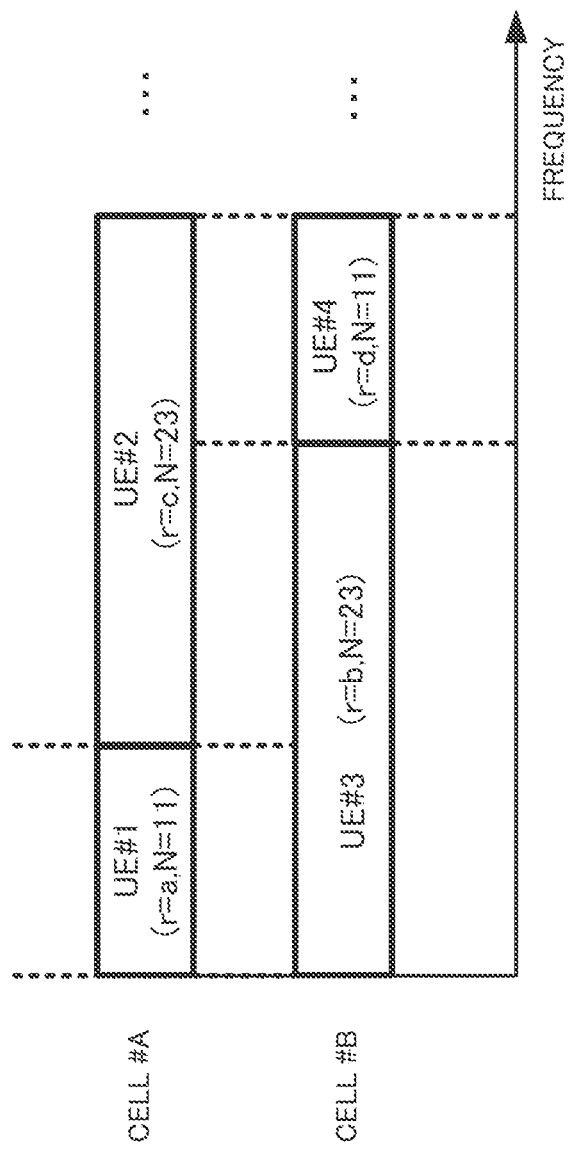
FIG. 3 is a diagram illustrating a method of allocating ZC sequences according to the prior art.
Figure 4:
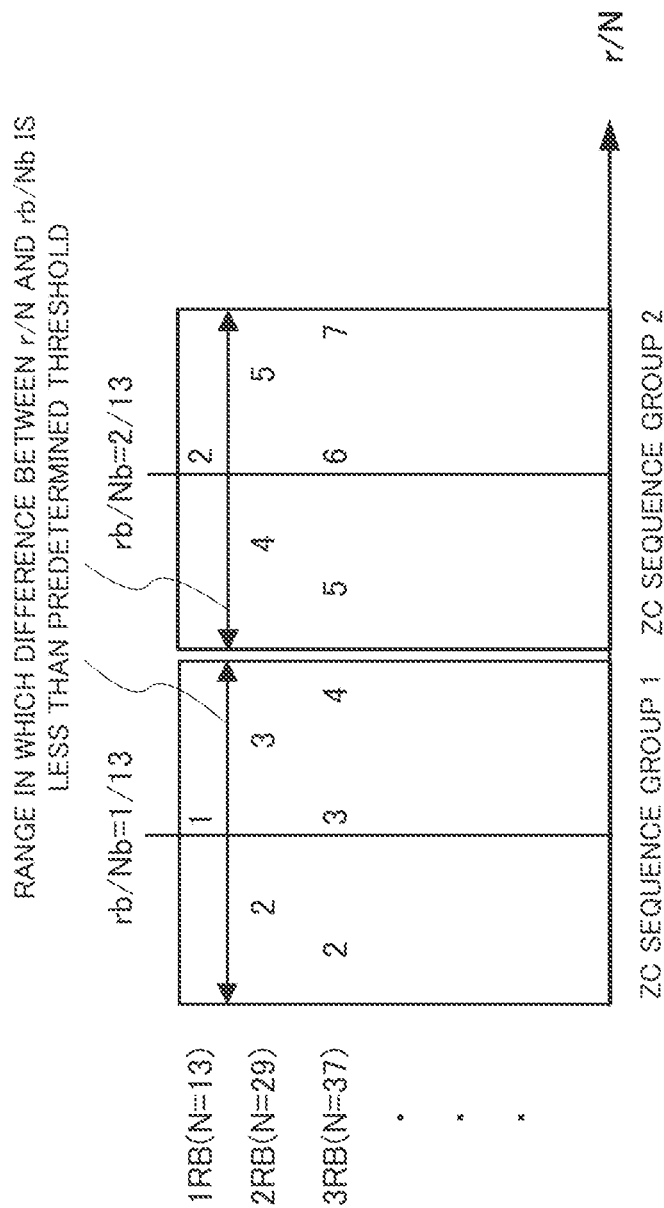
FIG. 4 is a diagram illustrating a method of generating sequence groups according to the prior art.
Figure 6:
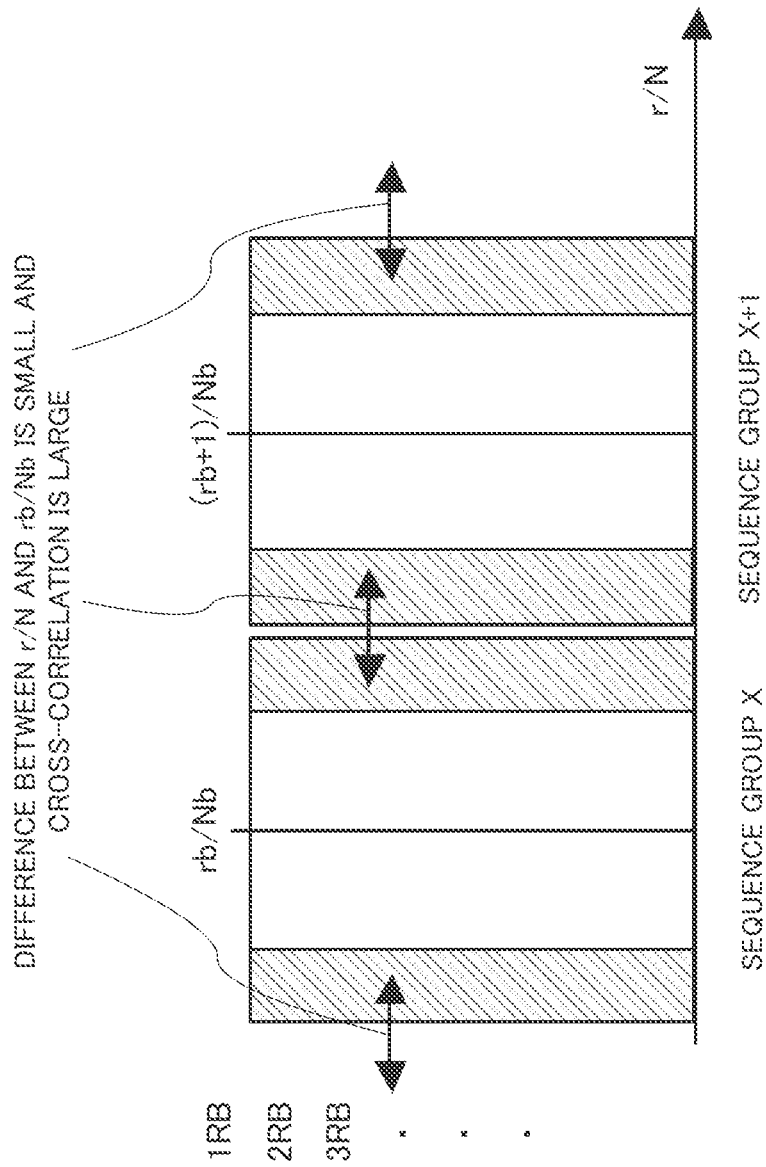
FIG. 6 is a diagram illustrating a problem with the prior art that arises when the threshold Xth is set higher.

Embodiments of the present disclosure will be explained below in detail with reference to the accompanying drawings. Here, in these embodiments, components providing the same functions will be assigned the same reference numerals and overlapping explanations will be omitted.

Embodiment 1

Figure 8:
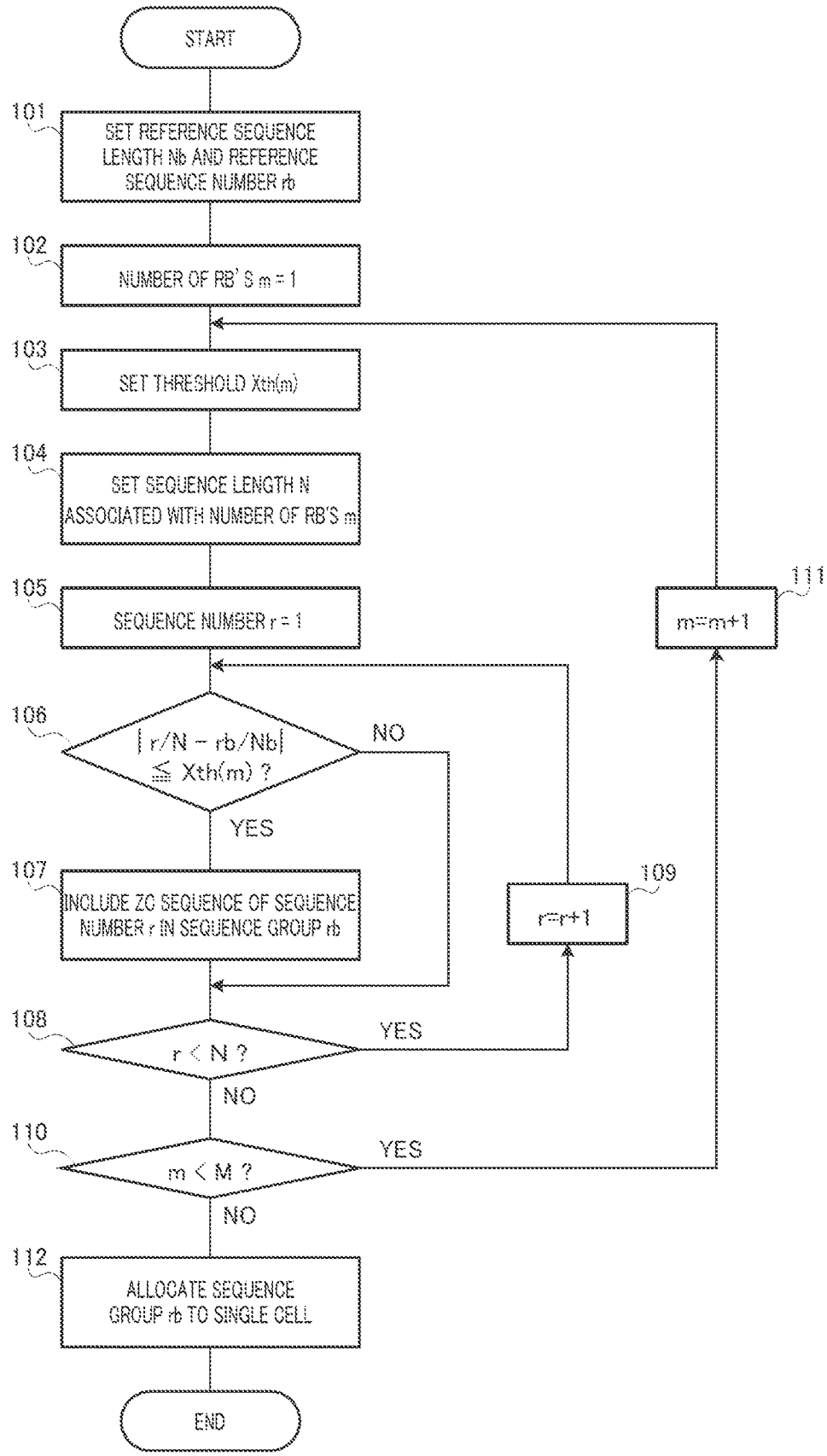
FIG. 8 is a flowchart showing the process of a sequence allocating method in a cellular radio communication system, according to Embodiment 1 of the present invention.

FIG. 8 is a flowchart showing the process of a sequence allocating method in a cellular radio communication system according to Embodiment 1 of the present disclosure.

First, in step (hereinafter "ST") 101, the reference sequence length Nb and the reference sequence number rb are set for a generated sequence group. Here, the sequence number rb corresponds to the sequence group number and is lower than Nb.

In ST 102, the number of RB's, m, is initialized to 1.

In ST 103, the threshold Xth(m) associated with the number of RB's m is set. Here, the method of setting the threshold Xth(m) will be described later.

In ST 104, the ZC sequence length N associated with the number of RB's m is set. The number of RB's "m" and the sequence length N are uniquely associated. For example, N is a prime number that is larger than the maximum possible size of transmission with the number of RB's, m, and that is the closest to this size.

In ST 105, the sequence number r is initialized to 1.

In ST 106, whether or not r and N satisfy following equation 4 is decided.

$$|r/N - rb/Nb| \leq Xth(m) \quad (4)$$

Following equation 5 is acquired from equation 4. Given that equation 4 and equation 5 are equivalent, in ST 106, whether or not r and N satisfy equation 5 may be decided.

$$(rb/Nb - Xth(m)) \times N \leq r \leq (rb/Nb + Xth(m)) \times N \quad (5)$$

In ST 106, if r and N are decided to satisfy equation 4 ("YES" in ST 106), the process of ST 107 is performed.

In ST 107, a ZC sequence having a sequence number of r is determined as one of ZC sequences associated with the number of RB's m in the sequence group rb.

In ST 106, when r and N are decided not to satisfy equation 4 ("NO" in ST 106), the process of ST 108 is performed.

In ST 108, whether or not r<N is decided.

In ST 108, if r<N is decided ("YES" in ST 108), the process of ST 109 is performed.

In ST 109, the sequence number r is incremented by 1 like r=r+1, and the process moves to ST 106.

In ST 108, if r<N is not decided ("NO" in ST 108), the process of ST 110 is performed.

In ST 110, whether or not m<M is decided. Here, M is the maximum value of the number of RB's in the sequence group rb and corresponds to the maximum value of the transmission bandwidth.

In ST 110, if m<M is decided ("YES" in ST 110), the process of ST 111 is performed.

In ST 111, the number of RB's m is incremented by one, like m=m+1, and the process moves to ST 103.

In ST 110, if m<M is not decided ("NO" in ST 110), the process of ST 112 is performed.

In ST 112, the generated sequence group rb is allocated to a single cell, that is, a single radio base station apparatus.

Next, the method of setting the threshold Xth(m) will be explained using two different cases. In above ST 103, it is possible to use either of following setting method 1 and setting method 2.

Threshold Xth(m) Setting Method 1

Figure 9:
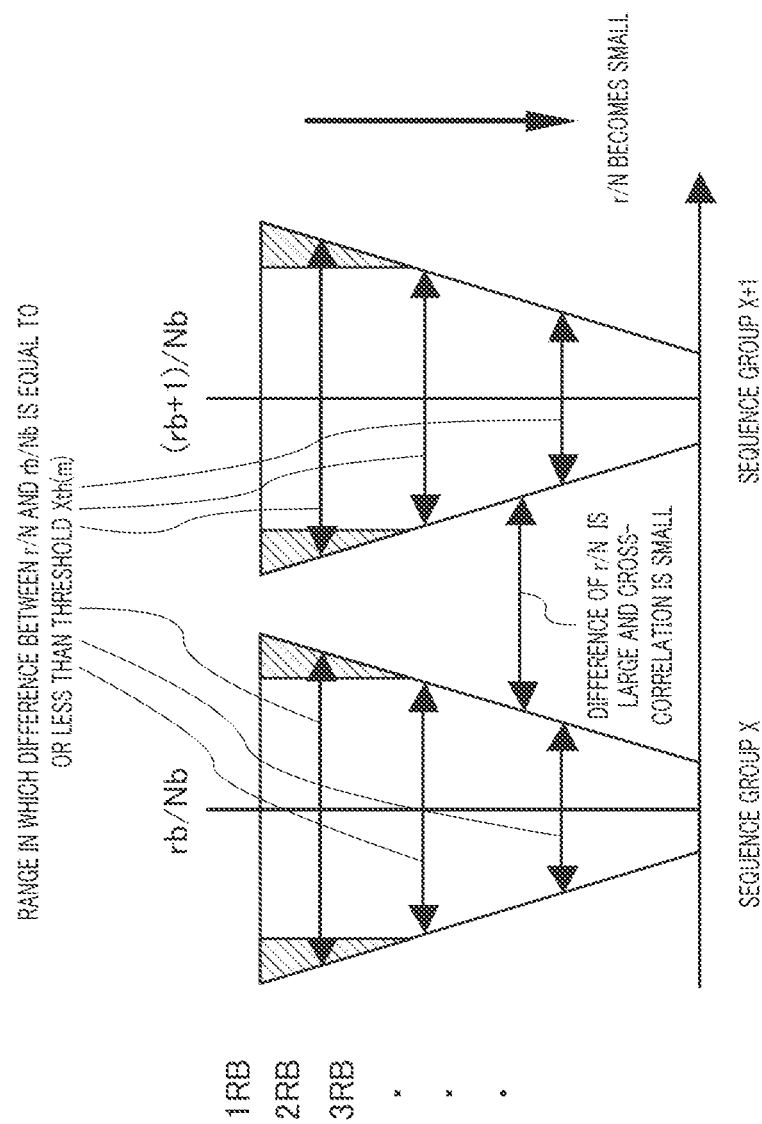
FIG. 9 is a diagram illustrating a method of setting a threshold in a sequence allocating method according to Embodiment 1 of the present invention.

FIG. 9 is a diagram illustrating threshold Xth(m) setting method 1 in a sequence allocating method according to the present embodiment. As shown in FIG. 9, the threshold Xth(m) is set smaller when an RB is greater. For example, as shown in following equation 6, the Xth(m) is set to decrease by a predetermined value every time the number of RB's m increases.

$$Xth(m) = 1/(2Nb) - (m-1) \times 0.0012 \quad (6)$$

By setting the threshold Xth(m) in this way, ZC sequences located near the boundary of adjacent sequence groups have a greater difference of r/N, so that it is possible to suppress an increase of cross-correlation. Also, by increasing the threshold Xth(m) associated with a smaller number of RB's, it is possible to increase the number of ZC sequences and maintain it above a predetermined number.

FIG. 10A and FIG. 10B illustrate examples of sequence groups acquired by the sequence allocating methods shown in FIG. 8 and FIG. 9. To be more specific, the sequence groups shown in FIG. 10A and FIG. 10B are acquired according to the following conditions and process. For example, to generate ZC sequence group 1 shown in FIG. 10A, in ST 101, Nb=13 and rb=1 are set. Here, Nb=13 represents the sequence length associated with the number of RB's m=1, and the sequence number rb=1 corresponds to the sequence group number. Next, in the process of ST 102, the threshold Xth(m) associated with the number of RB's is set using above equation 6, and, in the process of ST 104 to ST 107, the sequence number r that makes the difference between rb/Nb and r/N equal to or less than the threshold Xth(m) is selected, to generate ZC sequence group 1. The conditions and process for generating ZC sequence group 2 shown in FIG. 10B differ from those in the case of ZC sequence group 1, only in setting the reference sequence number rb to 2 in ST 101.

Threshold Xth(m) Setting Method 2

Figure 11:
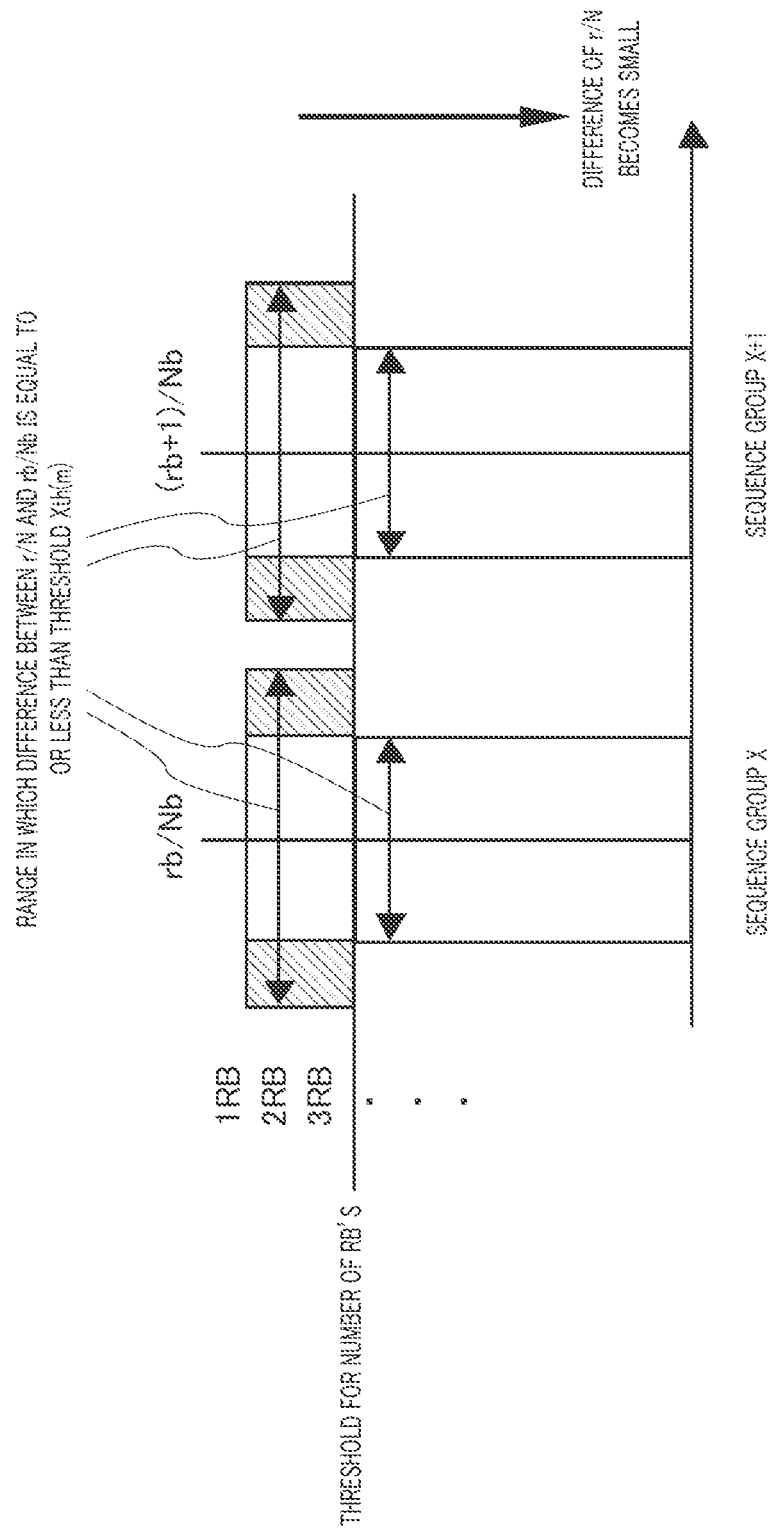
FIG. 11 is a diagram illustrating a method of setting a threshold according to a sequence allocating method according to Embodiment 1 of the present invention.

FIG. 11 is a diagram illustrating threshold Xth(m) setting method 2 in a sequence allocating method according to the present embodiment. As shown in FIG. 11, a threshold for the number of RB's "m" is set, and threshold Xth(m) is set higher below the threshold for the number of RB's than above the threshold for the number of RB's. For example, as shown in following equation 7, the threshold for the number of RB's m is 10, and, if the number of RB's m is equal to or lower than 10, Xth(m) is set to ½ Nb, and, if the number of RB's m is higher than 10, Xth(m) is set to ¼ Nb. That is, the threshold Xth(m) is switched between two fixed values across the sequence length N associated with the number of RB's of 10, and the fixed value associated with the sequence lengths N's associated with the numbers of RB's equal to or less than 10 is set lower than the fixed value associated with the sequence lengths N's associated with the numbers of RB's greater than 10.

$$Xth(m) = 1/(2Nb) \text{ (in the case of } 1 \leq m \leq 10\text{)}$$

$$Xth(m) = 1/(4Nb) \text{ (in the case of } m \geq 11\text{)} \quad (7)$$

By setting the threshold Xth(m) in this way, ZC sequences located near the boundary of adjacent sequence groups have a grater difference of r/N, so that it is possible to suppress an increase of cross-correlation. Also, by increasing the threshold Xth(m) associated with the numbers of RB's lower than the threshold for the number of RB's m, it is possible to increase the number of ZC sequences and maintain it above a predetermined number.

FIG. 12A and FIG. 12B illustrate examples of sequence groups acquired by the sequence allocating methods shown in FIG. 8 and FIG. 11. To be more specific, the conditions and process for acquiring the sequence groups shown in FIG. 12A and FIG. 12B (i.e., ZC sequence group 1 and ZC sequence group 2) differ from the conditions and process for acquiring the sequence groups shown in FIG. 10A and FIG. 10B (i.e., ZC sequence group 1 and ZC sequence group 2), only in using equation 7, instead of equation 6, for the method of setting the threshold Xth(m).

Next, the operations of a radio base station apparatus that is present in a cell, to which sequence groups generated based on the sequence allocating method according to the present embodiment are allocated, will be explained.

Figure 13:
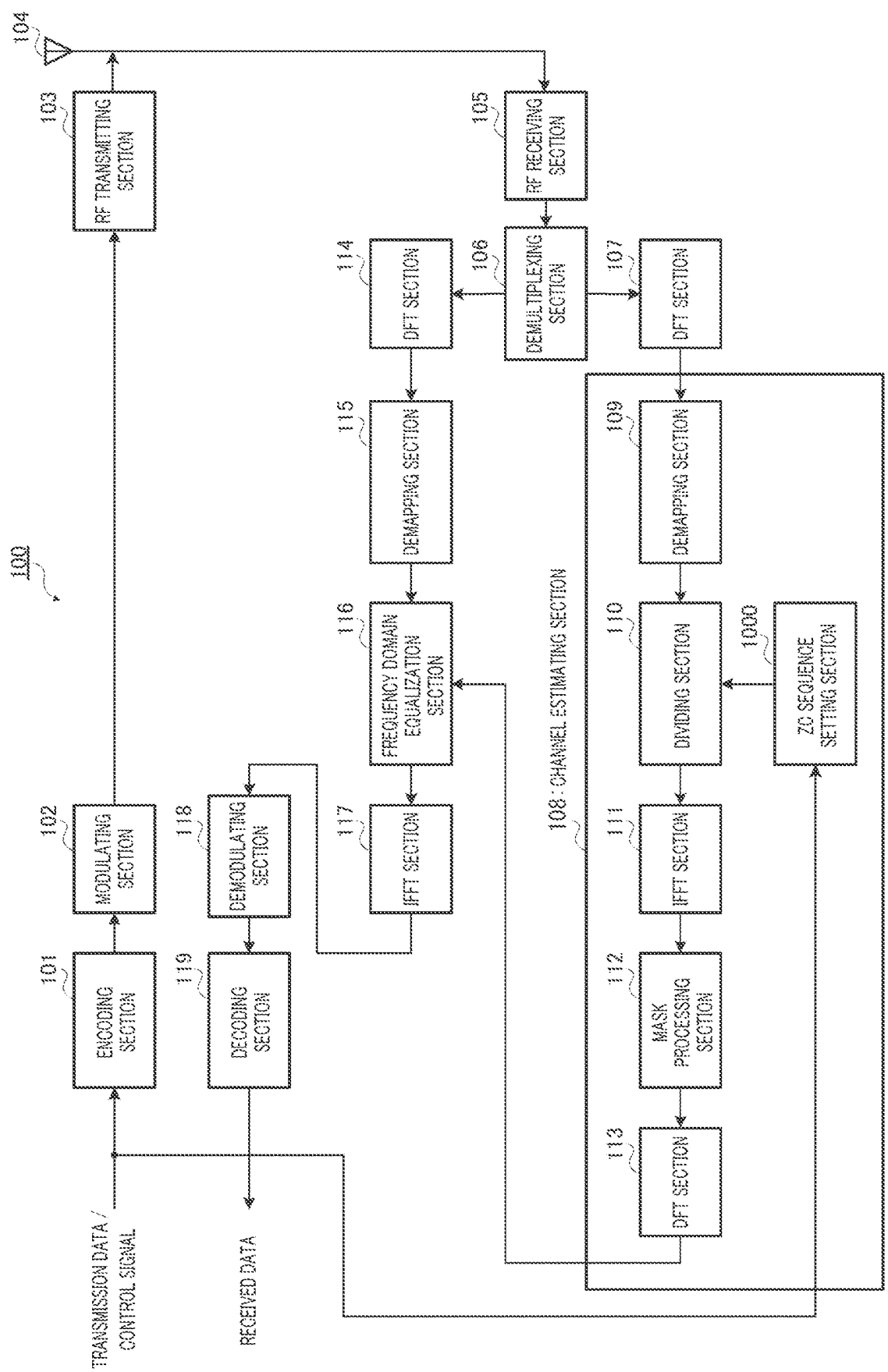
FIG. 13 is a block diagram showing the configuration of a radio base station apparatus to which a sequence group is allocated, according to Embodiment 1 of the present invention.

FIG. 13 is a block diagram showing the configuration of radio base station apparatus 100, to which sequence groups are allocated, according to the present embodiment.

Encoding section 101 encodes transmission data and control signal for a radio mobile station apparatus that is present in the same cell as that of radio base station apparatus 100, and outputs the encoded data to modulating section 102. Here, the control signal includes the reference sequence length Nb and the reference sequence number rb associated with the sequence group number, and the reference sequence length Nb and the reference sequence number rb are transmitted to, for example, radio mobile station apparatus 200, which will be described later, via a broadcast channel. The control signal also includes scheduling information showing the transmission bandwidth including, for example, the number of RB's for transmission allocated to radio mobile station 200 and the sequence length N, and this scheduling information is transmitted to radio mobile station apparatus 200 via a control channel.

Modulating section 102 modulates the encoded data received as input from encoding section 101 and outputs the modulated signal to RF (Radio Frequency) transmitting section 103.

RF transmitting section 103 performs transmission processing such as A/D conversion, up-conversion and amplification on the modulated signal received as input from modulating section 102, and transmits the signal subjected to transmission processing via antenna 104.

RF receiving section 105 performs reception processing such as down-conversion and A/D conversion on a signal received via antenna 104, and outputs the signal subjected to reception processing to demultiplexing section 106.

Demultiplexing section 106 demultiplexes the signal received as input from RF receiving section 105 into a reference signal, data signal and control signal, outputs the reference signal to DFT (Discrete Fourier Transform) section 107 and outputs the data signal and control signal to DFT section 114.

DFT section 107 transforms the time domain reference signal received as input from demultiplexing section 106 into a frequency domain signal by performing DFT processing, and outputs the transformed, frequency domain reference signal to demapping section 109 in channel estimating section 108.

Channel estimating section 108 is provided with demapping section 109, dividing section 110, IFFT section 111, mask processing section 112 and DFT section 113, and estimates the channel based on the reference signal received as input from DFT section 107.

Demapping section 109 extracts, from the frequency band reference signal received as input from DFT section 107, a ZC sequence corresponding to the transmission band of each radio mobile station apparatus 200, and outputs the extracted ZC sequences to dividing section 110.

ZC sequence setting section 1000 calculates the ZC sequences used in radio mobile station apparatuses 200, based on the reference sequence length Nb, the reference sequence number rb and the number of RB's assigned to each radio mobile station apparatus 200, which are included in control information received as input, and outputs the results to dividing section 110. Here, the internal configuration and operations of ZC sequence setting section 1000 will be described later.

Dividing section 110 divides the ZC sequences corresponding to each radio mobile station apparatus 200, calculated in ZC sequence setting section 1000, by the ZC sequences actually used in each radio mobile station apparatus 200 and received as input from demapping section 109, and outputs the division result to IFFT (Inverse Fast Fourier Transform) section 111.

IFFT section 111 performs IFFT processing on the division result received as input from dividing section 110, and outputs the signal subjected to IFFT processing to mask processing section 112.

Mask processing section 112 extracts the correlation value in the region in which the correlation value of the desired cyclic shift sequence is present, that is, extracts the correlation value in the window part, by performing mask processing on the signal received as input from IFFT section 111, and outputs the extracted correlation value to DFT section 113.

DFT section 113 performs DFT processing on the correlation value received as input from mask processing section 112, and outputs the correlation value subjected to DFT processing to frequency domain equalization section 116. Here, the signal subjected to DFT processing outputted from DFT section 113, represents the frequency response of the channel.

DFT section 114 transforms the time domain data signal and control signal received as input from demultiplexing section 106, into the frequency domain by performing DFT processing, and outputs the transformed, frequency domain data signal and control signal to demapping section 115.

Demapping section 115 extracts the data signal and control signal corresponding to the transmission band of each radio mobile station apparatus 200, from signals received as input from DFT section 114, and outputs the extracted signals to frequency domain equalization section 116.

Frequency domain equalization section 116 performs equalization processing on the data signal and control signal received as input from demapping section 115, using a signal which is received as input from DFT section 113 in channel estimating section 108 and which represents the frequency response of the channel, and outputs the signals subjected to equalization processing to IFFT section 117.

IFFT section 117 performs IFFT processing on the data signal and control signal received as input from frequency domain equalization section 116, and outputs the signals subjected to IFFT processing to demodulating section 118.

Demodulating section 118 performs demodulation processing on the signals subjected to IFFT processing received as input from IFFT section 117, and outputs the signals subjected to demodulation processing to decoding section 119.

Decoding section 119 performs decoding processing on the signals subjected to demodulation processing received as input from demodulating section 118, and extracts received data.

Figure 14:
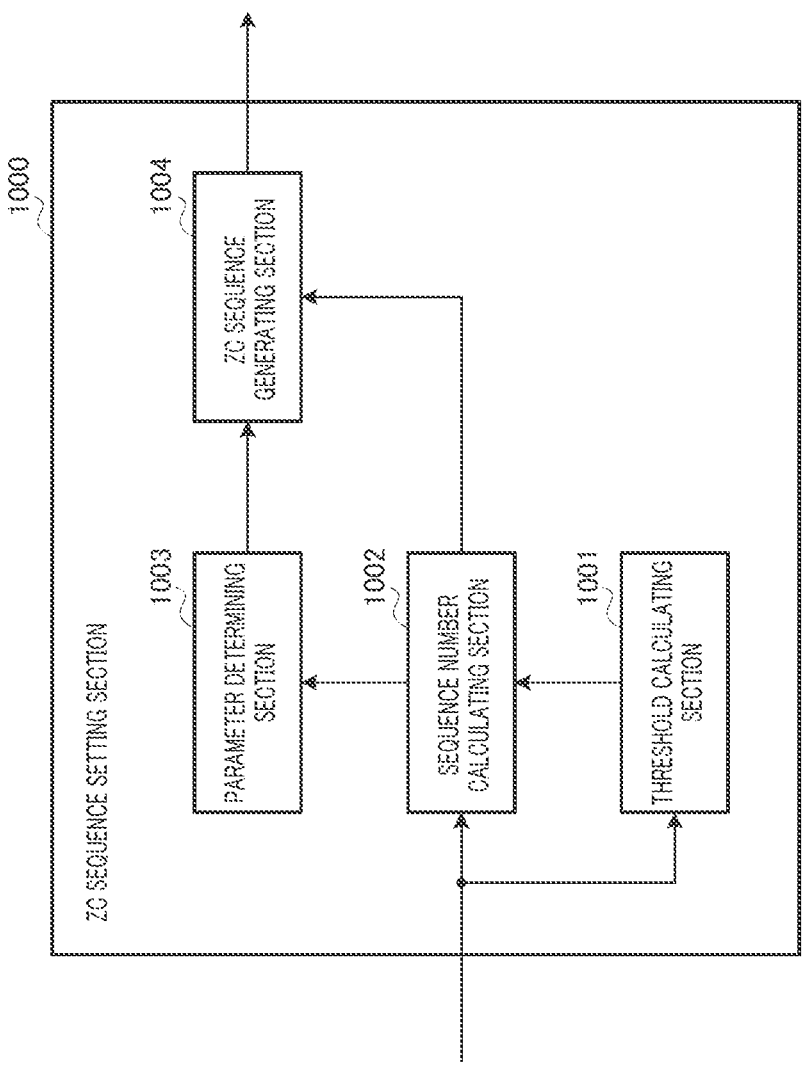
FIG. 14 is a block diagram showing the configuration inside a ZC sequence setting section according to Embodiment 1 of the present invention.

FIG. 14 is a block diagram showing the configuration inside ZC sequence setting section 1000.

Threshold calculating section 1001 calculate the threshold Xth(m) according to above equation 6 or equation 7, using the number of RB's m included in control information received as input, and outputs the result to sequence number calculating section 1002.

Sequence number calculating section 1002 calculates the sequence length N of a ZC sequence that can be used as a reference signal, based on the number of RB's m included in control information received as input, and outputs the result to ZC sequence generating section 1004. Also, sequence number calculating section 1002 calculates the sequence number r of a ZC sequence that can be used as a reference signal, based on the calculated sequence length N, the reference sequence number rb and the reference sequence length Nb included in the control information received as input, and the threshold Xth(m) received as input from threshold calculating section 1001, and outputs the result to parameter determining section 1003.

Parameter determining section 1003 selects one of usable r's received as input from sequence number calculating section 1002, and outputs the result to ZC sequence generating section 1004. To be more specific, parameter determining section 1003 selects r corresponding to the remainder acquired by dividing the frame number or slot number by the number of usable r's, that is, corresponding to the result of performing a modulo operation of the frame number or slot number by the number of usable r's. For example, upon receiving as input four usable r's of r=a, b, c and d from sequence number calculating section 1002, parameter determining section 1003 selects r=a when a result of performing a modulo operation on the frame number or slot number by 4 is 0, selects r=b when the result is 1, selects r=c when the result is 2, and selects r=d when the result is 3. By this means, it is possible to realize sequence hopping.

ZC sequence generating section 1004 generates a ZC sequence according to equation 1 or equation 2, using "r" received as input from parameter determining section 1003 and "N" received as input from sequence number calculating section 1002, and outputs the result to dividing section 110.

As described above, radio base station apparatus 100 signals the reference sequence number rb, the reference sequence length Nb and the number of RB's, to radio mobile station apparatus 200.

Next, radio mobile station apparatus 200 that generates a ZC sequence used as a reference signal will be explained, using the reference sequence number rb, the reference sequence length Nb and the number of RB's signaled from radio base station apparatus 100.

Figure 15:
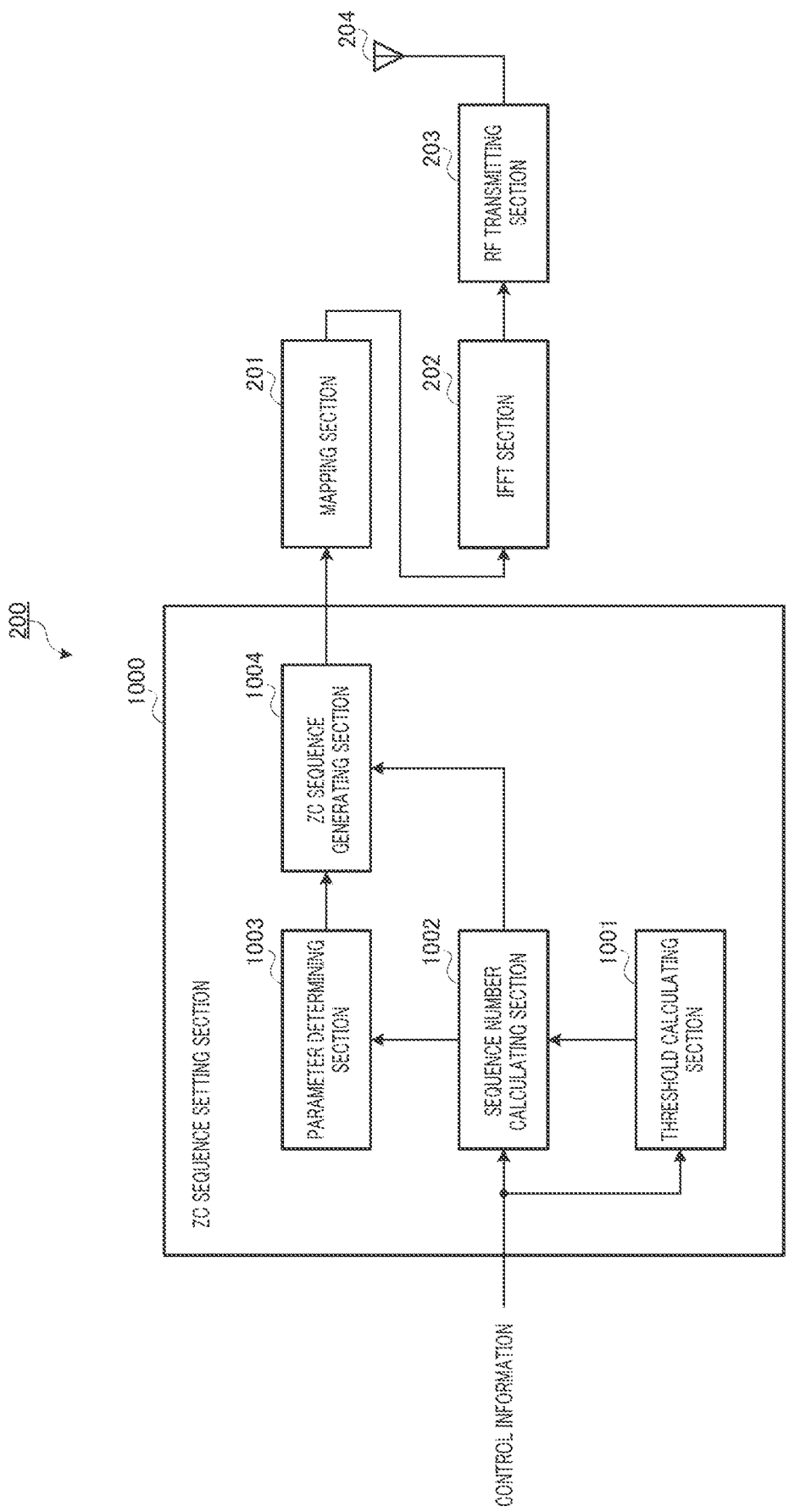
FIG. 15 is a block diagram showing the configuration of a radio mobile station apparatus according to Embodiment 1 of the present invention.

FIG. 15 is a block diagram showing the configuration of radio mobile station apparatus 200 according to the present embodiment. Here, in FIG. 15, the receiving system of radio mobile station apparatus 200 will be omitted, and the transmitting system alone will be shown.

In FIG. 15, similar to ZC sequence setting section 1000 provided in radio base station apparatus 100, ZC sequence setting section 1000 provided in radio mobile station apparatus 200 calculates a ZC sequence based on the reference sequence number rb, the reference sequence length Nb and the number of RB's m included in control information transmitted from radio base station apparatus 100, and outputs the result to mapping section 201.

Mapping section 201 maps the ZC sequence received as input from ZC sequence setting section 1000, to the transmission band of radio mobile station apparatus 200, and outputs the mapped ZC sequence to IFFT section 202.

IFFT section 202 performs IFFT processing on the ZC sequence received as input from mapping section 201, and outputs the ZC sequence subjected to IFFT processing to RF transmitting section 203.

RF transmitting section 203 performs transmission processing such as D/A conversion, up-conversion and amplification on the ZC sequence received as input from IFFT section 202, and transmits the signal subjected to transmission processing, via antenna 204.

Thus, according to the present embodiment, when the number of RB's increases, that is, when the ZC sequence length N is longer, a sequence group is generated using sequences that make the difference between r/N and rb/Nb smaller, and allocated to the single cell. By this means, it is possible to maintain a predetermined number of sequences in each RB while reducing cross-correlation between different sequence groups, thereby reducing inter-cell interference.

Also, although an example case has been described above with the present embodiment where the sequence length of one RB is used as the reference sequence length Nb in ST 101, the present disclosure is not limited to this, and it is equally possible to set the reference sequence length Nb adaptively. For example, taking into account that, amongst ZC sequences forming a certain sequence group, the reference ZC sequence has the lowest cross-correlation with other sequence groups, the reference sequence length Nb is the sequence length associated with the number of RB's used in a radio mobile station apparatus in the cell edge of the poorest received quality. By this means, it is further possible to reduce inter-cell interference.

Also, in a cellular communication system, it is equally possible to set the reference sequence length Nb based on the number of sequence groups required to reduce inter-cell interference. For example, when the number of sequence groups required is 100, the sequence length that is the closest to 100, that is, a sequence length of 109, associated with nine RB's, is set as the reference sequence length Nb. It is possible to generate 108 ZC sequences from nine RB's, that is, from a sequence length of 109, so that it is possible to select 100 reference sequence number r's from 108 reference sequence number r's and generate 100 different sequence groups.

Also, an example case has been described above with the present embodiment where the number of ZC sequences associated with a larger number of RB's is limited by setting the threshold Xth(m) smaller when the number of RB's is larger. However, the present disclosure is not limited to this, and it is equally possible to find predetermined ZC sequences arranged in ascending order of the difference between r/N and rb/Nb, and form a sequence group. That is, ZC sequences that make the difference between r/N and rb/Nb smaller are preferentially selected until the number of ZC sequences reaches a predetermined number. If the sequences are arranged based on the magnitude of r/N, the interval between sequences is 1/N, and the interval between sequences is smaller when an RB is larger (i.e., N is larger). Therefore, by the process of limiting the number of sequences, it is possible to provide the same effect as provided in the process of making the threshold Xth (m) smaller when an RB is larger. That is, even if sequence groups are generated in the above way, it is equally possible to provide an effect of reducing cross-correlation between sequence groups.

Also, an example case has been described above with the present embodiment where the reference sequence length Nb signaled from radio base station apparatus 100 to radio mobile station apparatus 200, with an assumption that the reference sequence length Nb varies between cells. However, the present disclosure is not limited to this, and, if a reference sequence length Nb that is common between all cells is determined in advance, signaling is not necessary. Alternatively, it is equally possible to determine in advance the reference number of RB's instead of the reference sequence length Nb. The numbers of RB's and sequence lengths are uniquely associated, so that it is possible to derive the reference sequence length Nb from the reference number of RB's.

Also, an example case has been described above with the present embodiment where sequence number calculating section 1002 calculates the usable sequence number r using the reference sequence number rb, the reference sequence length Nb and the number of RB's m. However, the present disclosure is not limited to this, and, if radio base station apparatus 100 and radio mobile station apparatus 200 hold the sequence groups shown in FIG. 10A and FIG. 10B or the sequence groups shown in FIG. 12A and FIG. 12B in the form of tables, sequence number calculating section 1002 may calculate the usable sequence number r by looking up these tables. An example method of determining the sequence number r using these tables will be explained below. For example, with an assumption that the reference sequence length Nb is fixed, tables are prepared for the two parameters of sequence length N and reference sequence number rb, and selectable r's are described therein. In this example, radio mobile station apparatus 100 receives the sequence length N and reference sequence number rb signaled from radio base station apparatus 200, refers to the tables associated with these items and determines a Zadoff-Chu sequence that should be used as a reference signal by selecting in a random manner one of the described values that r might assume.

Also, an example case has been described above with the present embodiment where parameter determining section 1003 selects one of usable sequence numbers r's based on the frame number or slot number. However, the present disclosure is not limited to this, and parameter determining section 1003 may select the minimum or maximum sequence number from usable sequence number r's.

Embodiment 2

The sequence allocating method according to Embodiment 2 of the present disclosure is based on the cross-correlation characteristic of ZC sequence ascertained by computer simulation by the present inventors.

Figure 16:
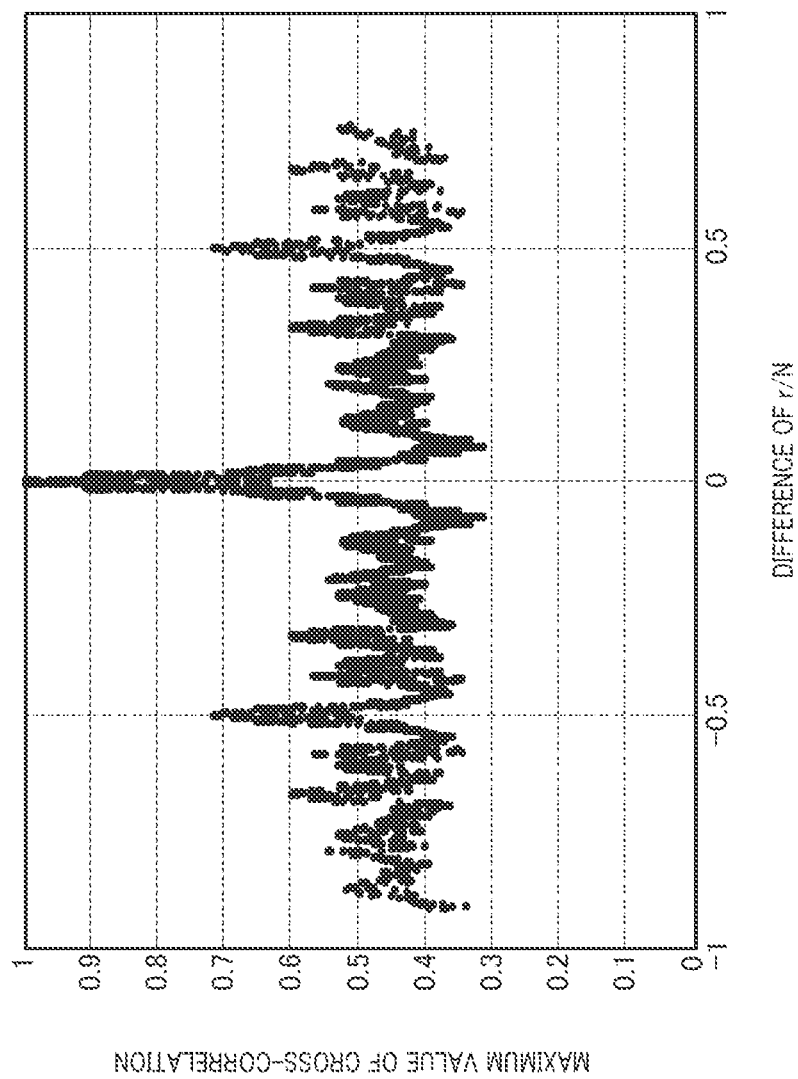
FIG. 16 is a diagram illustrating the cross-correlation characteristic ascertained by computer simulation according to Embodiment 2 of the present invention.

FIG. 16 is a diagram illustrating the cross-correlation characteristic of ZC sequence ascertained by computer simulation by the present inventors.

In FIG. 16, the horizontal axis represents the difference of r/N between ZC sequences of different transmission bandwidths or different sequence lengths, and the vertical axis represents the cross-correlation characteristic. As shown in FIG. 16, if the difference of r/N between ZC sequences of different transmission bandwidths or different sequence lengths is 0.0, the cross-correlation between ZC sequences is the largest, and, if the difference of r/N is 0.5, the cross-correlation between ZC sequences forms a peak. That is, the cross-correlation between ZC sequences of different transmission bandwidths or different sequence lengths increases when the difference of r/N is closer to 0.5.

The sequence allocating method according to the present embodiment has a feature of excluding a ZC sequence that makes a difference of r/N from the reference ZC sequence close to 0.5, from a sequence group.

Figure 17:
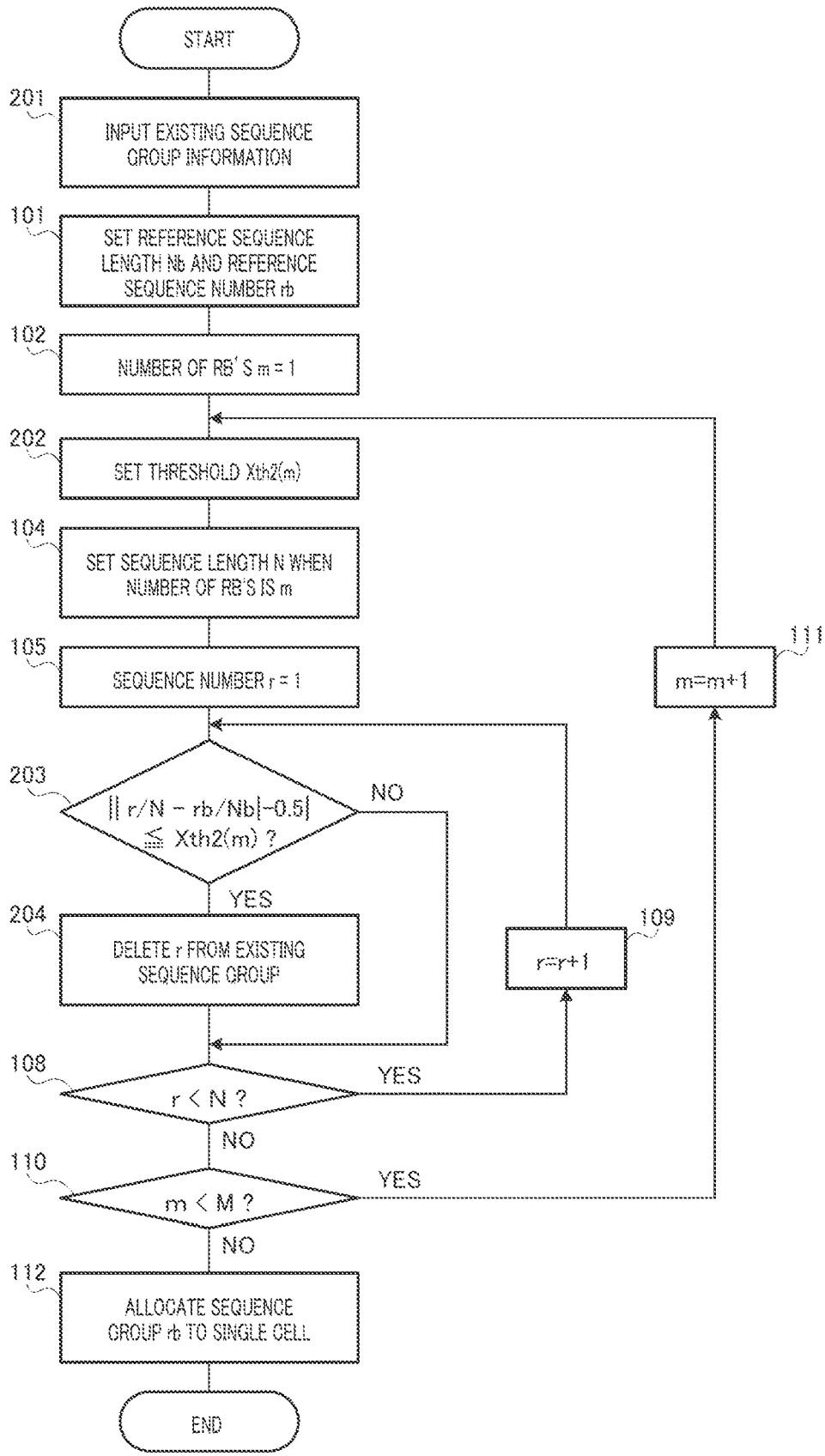
FIG. 17 is a flowchart showing the process of a sequence allocating method in a cellular radio communication system according to Embodiment 2 of the present invention.

FIG. 17 is a flowchart showing the process of the sequence allocating method in a cellular radio communication system according to the present embodiment. Here, in the process in FIG. 17, the same process as in FIG. 8 will be omitted.

In ST 201, as an existing sequence group, a sequence group formed with ZC sequences, in which the difference between r/N and rb/Nb is equal to or less than 1/26 regardless of the number of RB's, is inputted.

In ST 202, according to following equation 8, the threshold Xth2(m) is set in a case where the number of RB's is m. That is, Xth2(m) is set higher by a predetermined value every time the number of RB's increases.

$$X\text{th}2(m)=(m-1)\times0.0012 \tag{8}$$

In ST 203, whether or not r and N satisfy following equation 9 is decided.

$$||r/N-rb/Nb|-0.5|\leq X\text{th}2(m) \tag{9}$$

In ST 203, if r and N are decided to satisfy equation 9 ("YES" in ST 203), the process of ST 204 is performed.

In ST 204, the ZC sequence having r as a sequence number is deleted from the existing sequence group inputted in ST 201.

By contrast, if r and N are decided not to satisfy equation 9 ("NO" in ST 203), the process of ST 108 is performed.

Figure 18:
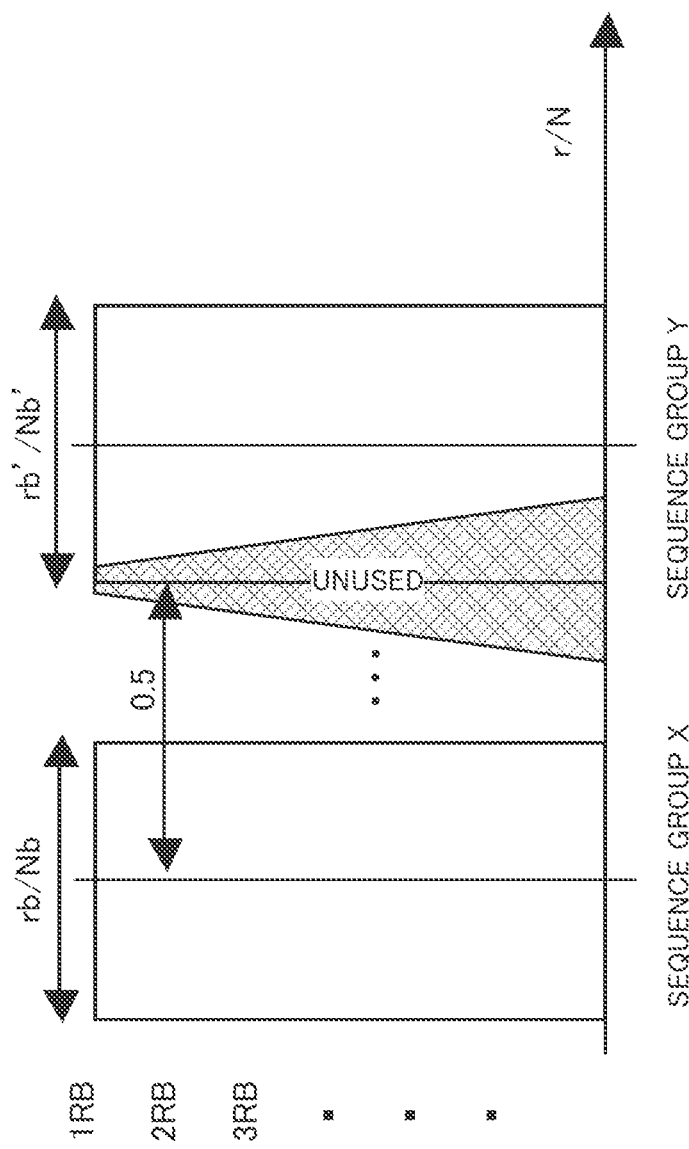
FIG. 18 is a diagram illustrating a method of generating sequence groups based on the process of a sequence allocating method according to Embodiment 2 of the present invention.

FIG. 18 is a diagram illustrating a method of generating sequence groups according to the process of the sequence allocating method in FIG. 17.

In FIG. 18, group X represents a sequence group including a reference sequence, and group Y represents an existing sequence group inputted in ST 201. Here, the hatched region represents ZC sequences in which the difference between r/N and rb/Nb in group X is close to 0.5, for example, in which the r/N difference stays within a range of (0.5−Xth2(m)) to (0.5+Xth2(m)). As shown in FIG. 18, in the sequence allocating method according to the present embodiment, ZC sequences, in which the difference between r/N and rb/Nb in group X stays within the range of (0.5−Xth2(m)) to (0.5+Xth2(m)), are deleted from the existing sequence group Y. By this means, cross-correlation between sequence groups is reduced. Also, according to equation 8, by setting the threshold Xth2(m) smaller when the number of RB's decreases and by reducing the number of sequences deleted, the number of ZC sequences deleted from a sequence group is limited.

FIG. 19A and FIG. 19B illustrate examples of sequence groups acquired by the sequence allocating method according to the present embodiment. To be more specific, the sequence groups shown in FIG. 19A and FIG. 19B (ZC sequence group 1 and ZC sequence group 8) are acquired according to the following conditions and process. For example, to generate ZC sequence group 1 shown in FIG. 19A, in ST 101, the reference sequence length Nb is set to 13, and the reference sequence number rb is set to 1. Here, an existing sequence group is comprised of sequences in which the difference from rb/Nb is equal to or less than 1/26, regardless of the number of RB's. In ST 202, using equation 8, the threshold Xth2(m) associated with the number of RB's is set, and a ZC sequence that satisfies equation 9 in ST 204 is deleted from the existing sequence group.

Thus, according to the present embodiment, upon generating sequence groups, the threshold Xth2(m) is set smaller when the number of RB's is smaller, and a ZC sequence, in which the difference between r/N and rb/Nb stays within a range of (0.5−Xth2(m)) to (0.5+Xth2(m)), is deleted from an existing sequence group. By this means, it is possible to reduce the cross-correlation between sequence groups and reduces inter-cell interference while maintaining the number of sequences forming sequence groups.

Also, an example case has been described above with the present embodiment where a sequence group comprised of ZC sequences, in which the difference between r/N and rb/Nb is equal to or less than 1/26, regardless of the number of RB's, is inputted as an existing sequence group in ST 201. However, the present disclosure is not limited to this, and it is equally possible to input a sequence group acquired in Embodiment 1 as an existing sequence group.

Also, although an example case has been described above with the present embodiment where a ZC sequence, in which the difference between r/N and rb/Nb stays within a range of (0.5−Xth2(m)) to (0.5+Xth2(m)), is deleted from an existing sequence group, the present disclosure is not limited to this, and, it is equally possible to further add conditions for deleting ZC sequences from a sequence group and delete only sequences associated with the numbers of RB's equal to or greater than a predetermined value, for example, 10. By this means, it is possible to prevent ZC sequences associated with smaller numbers of RB's from being deleted excessively and limit the number of ZC sequences deleted.

FIG. 20A and FIG. 20B show examples of sequence groups acquired when the number of RB's allowing a sequence to be deleted, is set 10 or more. Here, other conditions for acquiring the sequence groups shown in FIG. 20A and FIG. 20B (i.e., ZC sequence group 1 and ZC sequence group 8) are the same as the conditions for acquiring the sequence groups shown in FIG. 19A and FIG. 19B.

Also, an example case has been described above with the present embodiment where whether or not r and N satisfy equation 9 is decided in ST 203, the present disclosure is not limited to this, and it is equally possible to use following equation 10. By this means, it is possible to delete the same sequences as in the case of using equation 9, from a sequence group.

$$|r/N - rb/Nb| - (0.5/Nb)| \le X\text{th}2(m) \quad (10)$$

Also, an example case has been described above with the present embodiment where one sequence length, that is, one kind of the number of RB's is used as a reference in equation 9. However, the present disclosure is not limited to this, and it is equally possible to provide a plurality of reference sequence lengths used for a decision in equation 9, that is, a plurality of the reference numbers of RB's. For example, using three references of $Nb_1=13$, $Nb_2=29$ and $Nb_3=37$ associated with one RB, two RB's and three RB's, all sequences in which $||r/N - rb_1/Nb_1| - 0.5|$ is lower than a threshold, $||r/N - rb_2/Nb_2| - 0.5|$ is lower than a threshold and $||r/N - rb_3/Nb_3| - 0.5|$ is lower than a threshold, are deleted. Here, a plurality of the reference numbers of RB's need not be consecutive. For example, it is possible to set one RB and three RB's (i.e., N=13 and N=37) as the reference sequence length Nb.

Also, an example case has been described above with the present embodiment where ZC sequences, in which the difference between r/N and rb/Nb stays within a range of (0.5−Xth2(m)) to (0.5+Xth2(m)), are deleted from an existing sequence group. However, the present disclosure is not limited to this, and it is equally possible to further add the conditions of maintaining (leaving) predetermined sequences based on each number of RB's. To be more specific, the number of sequences p(m) to be maintained is set in advance in each RB, sequences are deleted in order from the sequence in which the difference between r/N and rb/Nb is the closest to 0.5, and deletion processing is stopped when the number of remaining sequences is p(m). By this means, it is possible to maintain required sequences in each RB.

Embodiments of the present disclosure have been explained above.

The sequence allocating method according to the present disclosure is not limited to the above embodiments, and can be implemented with various changes. For example, the above embodiments can be implemented with adequate combinations.

Also, in the above embodiments, as further conditions for generating sequence groups, sequences, in which CM (Cubic Metric) or PAPR is greater than a predetermined value, such as CM or PAPR in QPSK, may not be used and may be deleted from a sequence group. In this case, the magnitude of CM or PAPR is less biased between sequence groups, so that, even if such conditions are added, it is possible to make the number of sequences substantially equal between sequence groups, and the number of sequences that can be used in each sequence group is not biased.

Also, although an example case has been described above with embodiments where sequence groups are formed using frequency domain ZC sequences, the present disclosure is not limited to this, and it is equally possible to form sequence groups using ZC sequences that are generated in the time domain. Here, time domain ZC sequences and frequency domain ZC sequences satisfy the relationship represented by following equation 11.

$$(u \times r) \bmod(N) = N - 1 \quad (11)$$

In equation 11, N represents the ZC sequence length, r represents the sequence number of time domain ZC sequence, and u represents the sequence number of frequency domain ZC sequence. Therefore, when a sequence group is formed using time domain ZC sequences, ZC sequences, in which the difference of u/N from the reference sequence is less than a predetermined threshold, are found. Time domain ZC sequences and frequency domain ZC sequences share the same characteristics, and therefore the same effect is acquired.

Also, although an example case has been described above with embodiments where a ZC sequence is used as a reference signal for channel estimation, the present disclosure is not limited to this, and it is equally possible to use a ZC sequence as, for example, a reference signal for CQI estimation (i.e., sounding RS), synchronization channel, random access preamble signal, CQI signal or ACK/NACK signal.

Also, although an example case has been described above with embodiments where a ZC sequence is used as a reference signal from a radio mobile station apparatus to a radio base station apparatus, the present disclosure is not limited to this, and it is equally possible to apply the present disclosure to a case where a ZC sequence is used as a reference signal from a radio base station apparatus to a radio mobile station apparatus.

Also, although an example case has been described above with embodiments where a ZC sequence is used as a reference signal, it is equally possible to use, for example, a GCL (Generalized Chirp-Like) sequence c(k) represented by following equation 12, as a reference signal.

$$c(k) = a(k)b(k \bmod m), k = 0, 1, \ldots, N-1 \quad (12)$$

In equation 12, N represents the sequence length, and the relationship of $N = sm^2$ (where s and m are integers) or $N = tm$ (where t and m are integers) holds. Here, a(k) is the ZC sequence represented by equation 1 or equation 2, and b(k) is a DFT sequence represented by following equation 13.

$$b_i(k) = W_m^{ik}, i, k = 0, 1, \ldots, m-1 \quad (13)$$

Also, although the above embodiments use the condition "equal to or less than a threshold" as a decision condition, it is equally possible to use the condition "less than a threshold" as a decision condition.

Also, the above embodiments have been described using Zadoff-Chu sequences. However, Zadoff-Chu sequences are not limited to the sequences represented by the above equations, and include a sequence generated by repeating part of a Zadoff-Chu sequence, a sequence generated by truncating part of a Zadoff-Chu sequence and a sequence generated by removing part of a Zadoff-Chu sequence.

Although a case has been described above with embodiments as an example where the present disclosure is implemented with hardware, the present disclosure can be implemented with software.

Furthermore, each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells in an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No.2007-160348, filed on Jun. 18, 2007, including the specification, drawings and abstract, is incorporated herein by reference in its entirety.

Industrial Applicability

The sequence allocating method, transmitting method and radio mobile station apparatus according to the present disclosure can reduce cross-correlation between different sequence groups while maintaining the number of ZC sequences forming a sequence group, and are applicable to a cellular radio communication system.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system comprising:
a reception apparatus including:
a transmitter, which, in operation, transmits, to a transmission apparatus, control information associated with one or more sequences; and
a receiver, which, in operation, receives, from the transmission apparatus, a reference signal generated based on the control information; and
the transmission apparatus including:
a receiver, which, in operation, receives, from the reception apparatus, the control information;
circuitry, which, in operation, generates the reference signal using one of the one or more sequences based on the control information, the one or more sequences being grouped into a group and being M number of sequences with sequence numbers r, by which absolute value of difference between rb/Nb and r/N is the smallest M values, where Nb is a defined sequence length which is common to all cells, rb is an integer number which is less than Nb, and N is a sequence length which depends on a transmission bandwidth; and
a transmitter, which, in operation, transmits, to the reception apparatus, the reference signal.

2. The system according to claim 1, wherein the one or more sequences are Zadoff-Chu sequences $a_r(k)$ defined by $$a_r(k) = e^{-j\frac{2\pi r}{N}(k(k+1)/2+qk)}$$

wherein k and q are arbitrary integers.

3. The system according to claim 1, wherein the sequence length N is associated with the transmission bandwidth.

4. The system according to claim 1, wherein the one or more sequences are the M number of sequences with sequence numbers r, by which the absolute value is smaller as the transmission bandwidth is wider.

5. The system according to claim 1, wherein a number of the sequences available is limited by grouping the one or more sequences that are the M number of sequences.

6. The system according to claim 1, wherein said receiver of the reception apparatus receives the reference signal generated using one of the grouped one or more sequences according to a cell.

7. The system according to claim 1, wherein the reference signal is a sounding reference signal (sounding RS).

8. The system according to claim 1, wherein said receiver of the reception apparatus receives the reference signal generated using one sequence which is selected among the grouped one or more sequences with sequence hopping.

9. The system according to claim 1, wherein said receiver of the reception apparatus receives the reference signal generated using one sequence which is selected among the grouped one or more sequences with sequence hopping based on a frame number or slot number.

10. A system comprising:
a reception apparatus including:
a transmitter, which, in operation, transmits, to a transmission apparatus, control information associated with one or more sequences; and
a receiver, which, in operation, receives, from the transmission apparatus, a reference signal generated based on the control information; and
the transmission apparatus including:
a receiver, which, in operation, receives, from the reception apparatus, the control information;
circuitry, which, in operation, generates the reference signal using one of the one or more sequences based on the control information, the one or more sequences are M number of sequences with sequence numbers r, by which absolute value of difference between rb/Nb and r/N is less than or equal to a determined value, where Nb is a defined sequence length which is common to all cells, rb is an integer number which is less than Nb, N is a sequence length which depends on a transmission bandwidth, and the determined value for a wide transmission bandwidth is smaller than that for a narrow transmission bandwidth; and a transmitter, which, in operation, transmits, to the reception apparatus, the reference signal.

11. The system according to claim 10, wherein the wider the transmission bandwidth is, the smaller the determined value is.

12. The system according to claim 10, wherein a definition of the determined value is different across a threshold value.

13. A communication method comprising:

transmitting, from a reception apparatus to a transmission apparatus, control information associated with one or more sequences;

receiving, at the transmission apparatus, the control information;

generating, at the transmission apparatus, a reference signal using one of the one or more sequences based on the control information, the one or more sequences being grouped into a group and being M number of sequences with sequence numbers r, by which absolute value of difference between rb/Nb and r/N is the smallest M values, where Nb is a defined sequence length which is common to all cells, rb is an integer number which is less than Nb, N is a sequence length which depends on a transmission bandwidth;

transmitting, from the transmission apparatus to the reception apparatus, the reference signal; and receiving, at the reception apparatus, the reference signal.

14. A communication method comprising:

transmitting, from a reception apparatus to a transmission apparatus, control information associated with one or more sequences;

receiving, at the transmission apparatus, the control information;

generating, at the transmission apparatus, a reference signal using one of the one or more sequences based on the control information, the one or more sequences are M number of sequences with sequence numbers r, by which absolute value of difference between rb/Nb and r/N is less than or equal to a determined value, where Nb is a defined sequence length which is common to all cells, rb is an integer number which is less than Nb, N is a sequence length which depends on a transmission bandwidth, and the determined value for a wide transmission bandwidth is smaller than that for a narrow transmission bandwidths;

transmitting, from the transmission apparatus to the reception apparatus, the reference signal; and receiving, at the reception apparatus, the reference signal.

* * * * *